United States Patent
Yoon et al.

(10) Patent No.: US 9,734,118 B2
(45) Date of Patent: Aug. 15, 2017

(54) SERIAL BUS INTERFACE TO ENABLE HIGH-PERFORMANCE AND ENERGY-EFFICIENT DATA LOGGING

(71) Applicant: THE REGENTS OF THE UNIVERSITY OF CALIFORNIA, Oakland, CA (US)

(72) Inventors: Eunbae Yoon, Irvine, CA (US); Pai H. Chou, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 14/515,330

(22) Filed: Oct. 15, 2014

(65) Prior Publication Data
US 2015/0293880 A1 Oct. 15, 2015

Related U.S. Application Data

(60) Provisional application No. 61/891,884, filed on Oct. 16, 2013.

(51) Int. Cl.
*G06F 3/00* (2006.01)
*G06F 13/00* (2006.01)
(Continued)

(52) U.S. Cl.
CPC ...... *G06F 13/4282* (2013.01); *G06F 11/3476* (2013.01); *G06F 12/0238* (2013.01);
(Continued)

(58) Field of Classification Search
CPC ............ G06F 13/4282; G06F 11/3467; G06F 12/0238; G06F 12/0246; G06F 12/0868; G06F 13/1673; G06F 13/287
(Continued)

(56) References Cited

U.S. PATENT DOCUMENTS

| | | | |
|---|---|---|---|
| 2002/0083232 A1* | 6/2002 | Dute | G05B 19/0423 710/31 |
| 2003/0007484 A1* | 1/2003 | Beshai | H04Q 11/0005 370/370 |

(Continued)

OTHER PUBLICATIONS

Banerjee, A., et al., "Rise—Co—S : High Performance Sensor Storage and Co-Processing Architecture", Second Annual IEEE Communications Society Conference on Sensor and Ad Hoc Communications and Networks (SECON), Santa Clara, CA, Sep. 2005, pp. 1-11.
(Continued)

*Primary Examiner* — Farley Abad
*Assistant Examiner* — Henry Yu
(74) *Attorney, Agent, or Firm* — One LLP

(57) ABSTRACT

A new serial bus interface module that enables constrained sensor systems to better match flash-based storage devices' (SD card) read and write performance. The serial bus interface module augments existing flash-based storage with non-volatile random-access memory to form a hybrid storage system using the most popularly used master-slave bus architecture. Together with PSC-like features, the serial bus interface module not only enables slave-to-slave transfer (therefore eliminating the double-transaction problem) but also reads caching (one source to multi-sink) and buffering while flushing. These transaction types enable multi-sector write for significantly faster speed and lower energy overhead, while the use of non-volatile memory for metadata caching means low risk of file-system corruption in the event of power failure. The serial bus interface also enables the direct data transfer from sensors to storage or communication modules without requiring the microprocessor's intervention.

20 Claims, 21 Drawing Sheets

(51) Int. Cl.
*G06F 13/14* (2006.01)
*G06F 13/42* (2006.01)
*G06F 13/28* (2006.01)
*G06F 13/16* (2006.01)
*G06F 12/02* (2006.01)
*G06F 11/34* (2006.01)
*G06F 12/0868* (2016.01)
*G06F 13/38* (2006.01)
*G06F 12/0804* (2016.01)

(52) U.S. Cl.
CPC ...... *G06F 12/0246* (2013.01); *G06F 12/0868* (2013.01); *G06F 13/1673* (2013.01); *G06F 13/287* (2013.01); *G06F 13/385* (2013.01); *G06F 12/0804* (2013.01); *G06F 2212/214* (2013.01); *G06F 2212/222* (2013.01); *G06F 2212/463* (2013.01); *G06F 2212/466* (2013.01); *G06F 2212/62* (2013.01); *G06F 2212/7203* (2013.01); *G06F 2212/7208* (2013.01); *Y02B 60/1225* (2013.01); *Y02B 60/1228* (2013.01); *Y02B 60/1235* (2013.01)

(58) Field of Classification Search
USPC .................. 710/10, 310; 714/6.12; 367/118; 702/62; 370/255, 257, 370, 464
See application file for complete search history.

(56) References Cited

U.S. PATENT DOCUMENTS

| | | | | |
|---|---|---|---|---|
| 2005/0143942 A1* | 6/2005 | Blake | ............ | H03G 3/001 702/62 |
| 2006/0125322 A1* | 6/2006 | Foard | ............ | G06F 1/3209 307/112 |
| 2008/0028110 A1* | 1/2008 | Dawson | ............ | G06F 13/28 710/26 |
| 2008/0138067 A1* | 6/2008 | Beshai | ............ | H04L 49/357 398/45 |
| 2008/0207154 A1* | 8/2008 | Gohn | ............ | H04B 1/28 455/296 |
| 2009/0037636 A1* | 2/2009 | Fan | ............ | G06F 13/4059 710/310 |
| 2010/0017650 A1* | 1/2010 | Chin | ............ | G06F 13/28 714/6.12 |
| 2010/0199007 A1* | 8/2010 | Kapelner | ............ | G06F 13/423 710/110 |
| 2010/0296559 A1* | 11/2010 | Barbieri | ............ | G06F 13/409 375/222 |
| 2012/0170412 A1* | 7/2012 | Calhoun | ............ | G01S 3/8083 367/118 |

OTHER PUBLICATIONS

Chang, GH, "Enhanced SPI Communication by Combining Pause-Switch Circuit and Direct Memory Access Controllers", thesis submitted to National Tsing Hua University, 2011, pp. 1-53.

Doh, I. H., et al., "NVFAT: A FAT-Compatible File System with NVRAM Write Cache for its Metadata", IEEE Transactions on Information and Systems, 2010, vol. E93.D, No. 5, pp. 1137-1146.

Kim, S., et al., "Smart Wireless Sensor System for Lifeline Health Monitoring under a Disaster Event", Proceedings of the SPIE, 2011, vol. 7983, pp. 79832A-1-79832A-13.

Mihic, K., et al., "MStore: Enabling Storage Centric Sensornet Research", IPSN'07 Track on Sensor Platforms, Tools and Design Methods (SPOTS), Apr. 2007, pp. 1-8.

Mitra, A., et al., "High Performance, Low Power Sensor Platforms Featuring Gigabyte Scale Storage", Proceedings of Third International Workshop on Measurement, Modeling, and Performance Analysis of Wireless Sensor Networks (SenMetrics), San Diego, CA, Jul. 2005, pp. 148-157.

Pan, L., "Enhanced SPI Bus Communication with Pause-Switch Circuit", thesis submitted to the University of California, Irvine, 2008, pp. 1-52.

Yoo, SM, et al., "MHP: Master-Handoff Protocol for Fast and Energy-Efficient Data Transfer over SPI in Wireless Sensing Systems", ETRI Journal, 2012, vol. 34, No. 4, pp. 553-563.

* cited by examiner (a) Single-Sector Write (b) Multiple-Sector Write

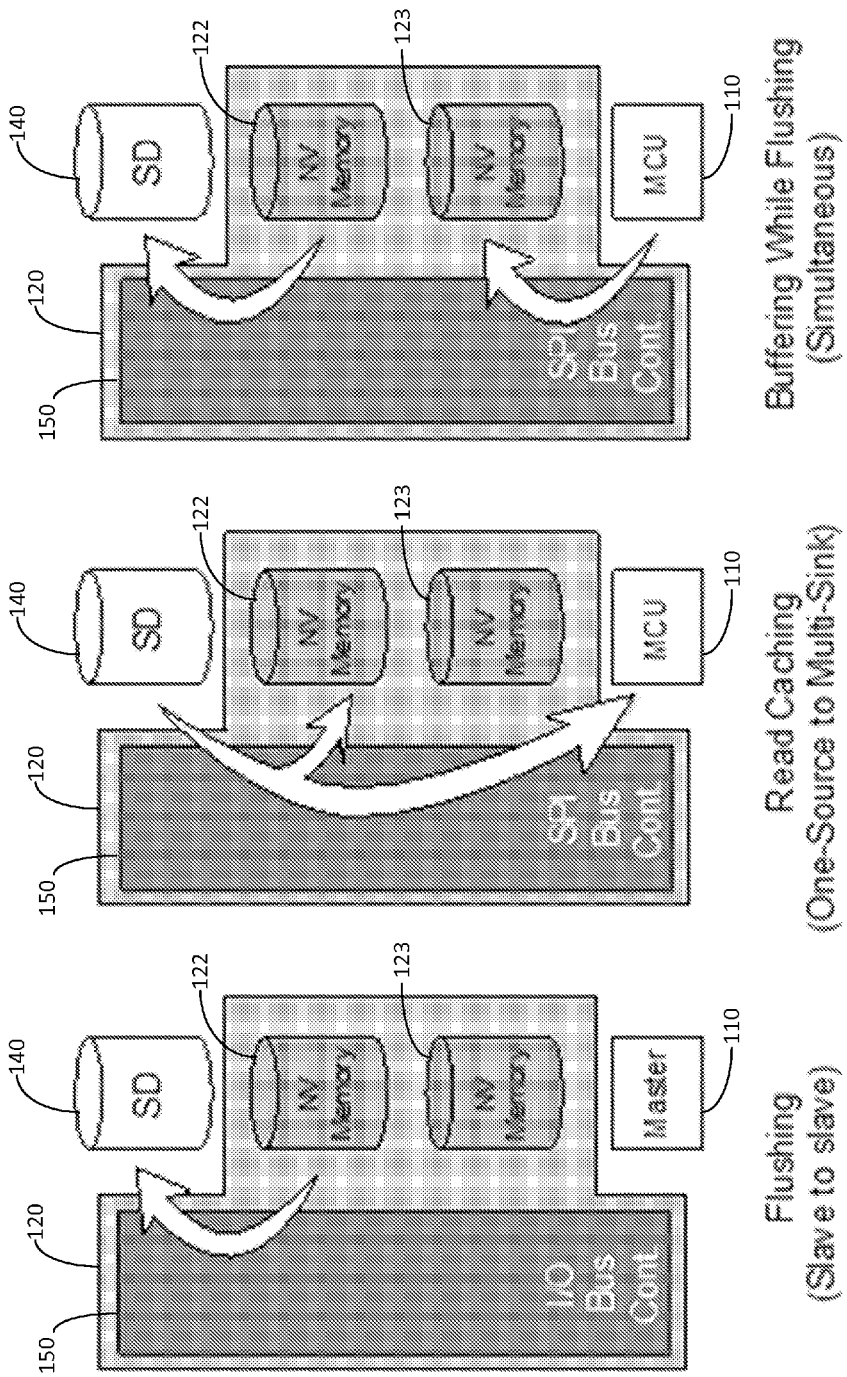

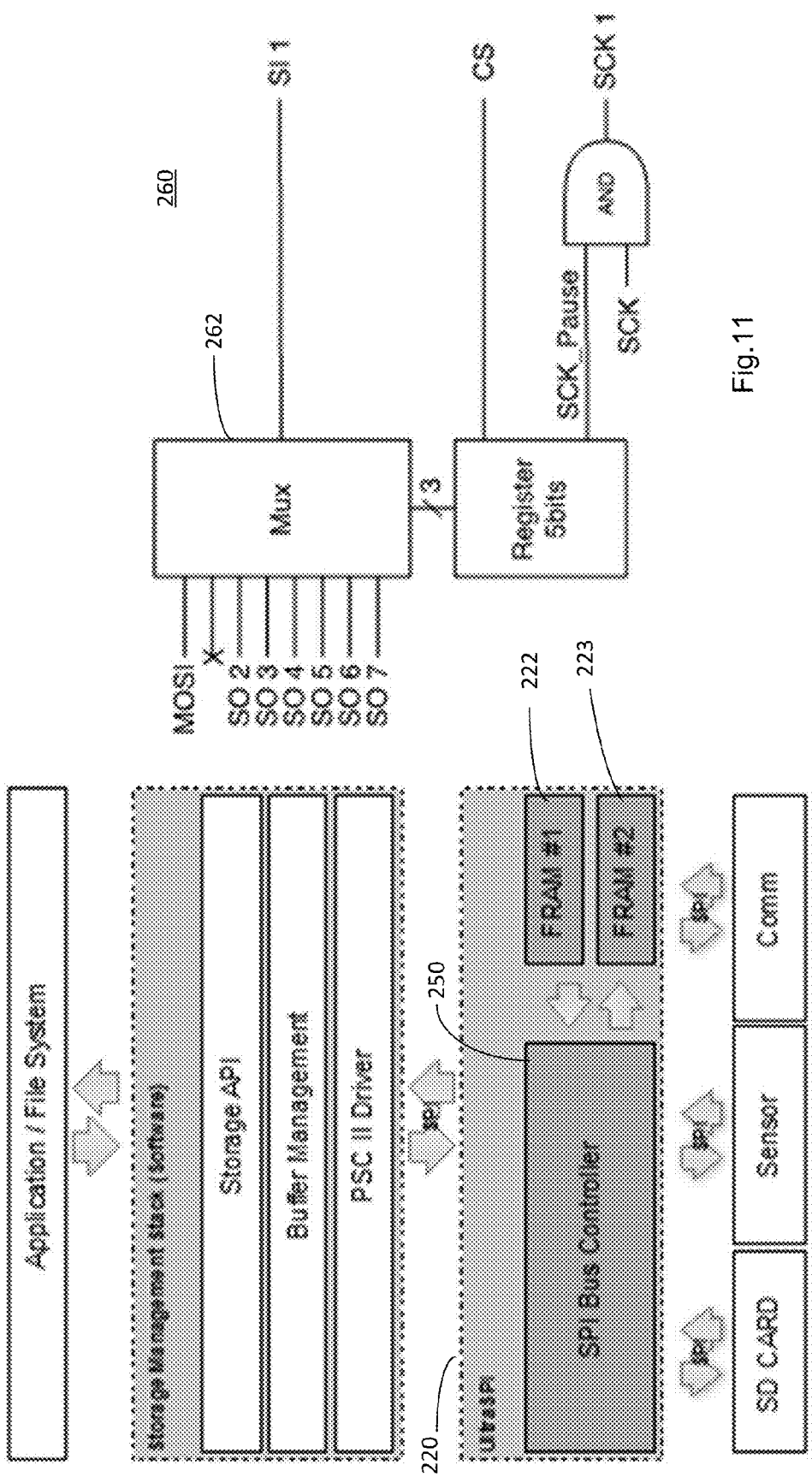

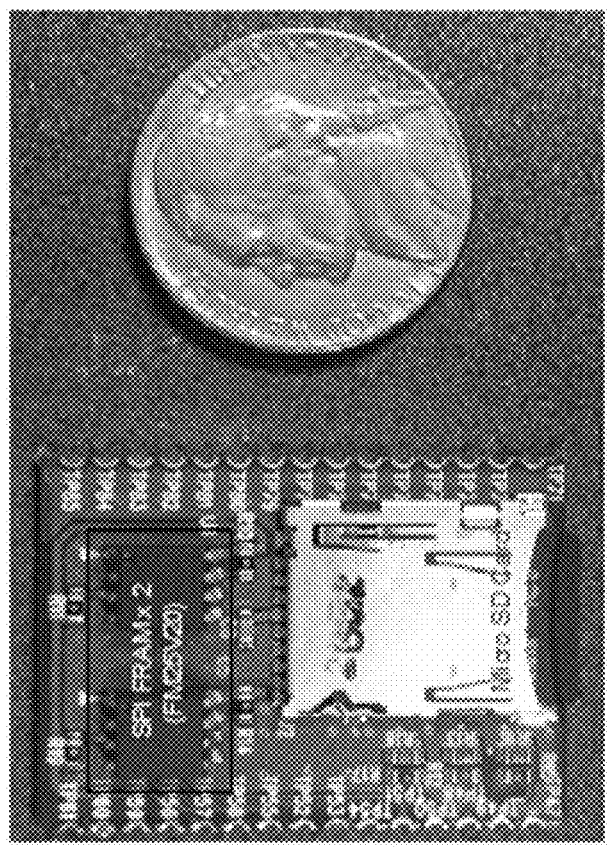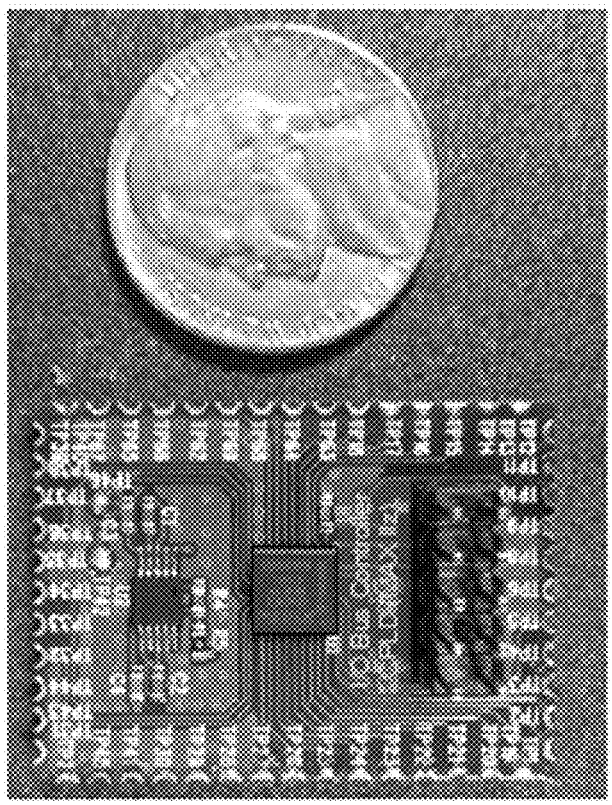
Fig.16

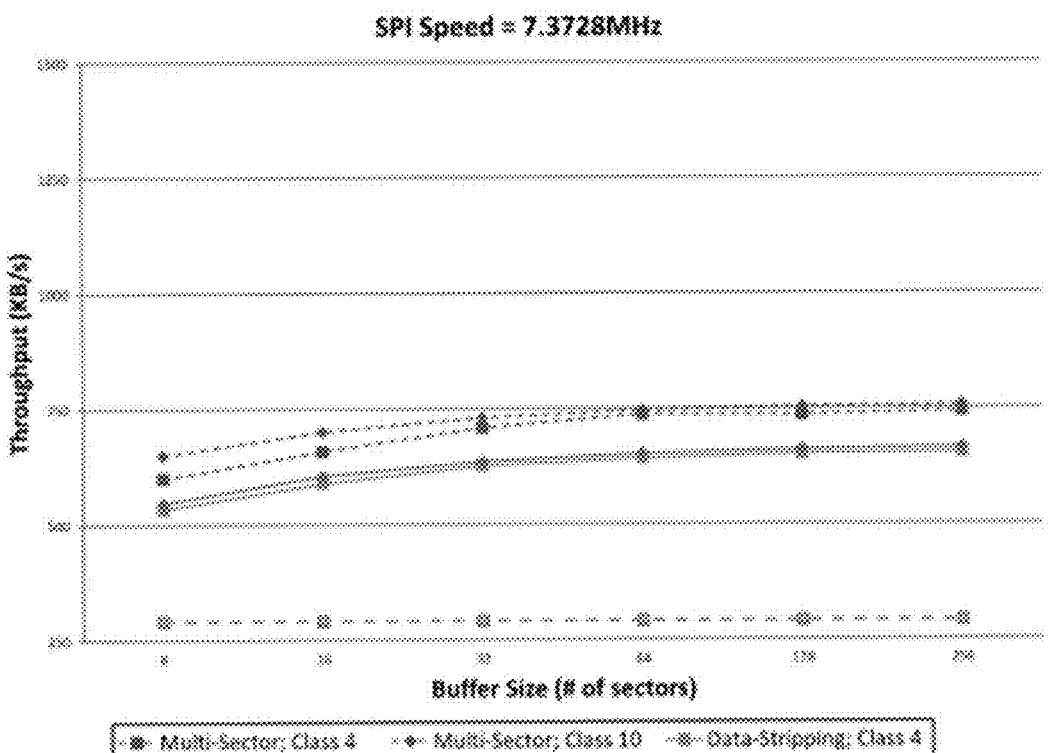
(a) 7.3728 MHz
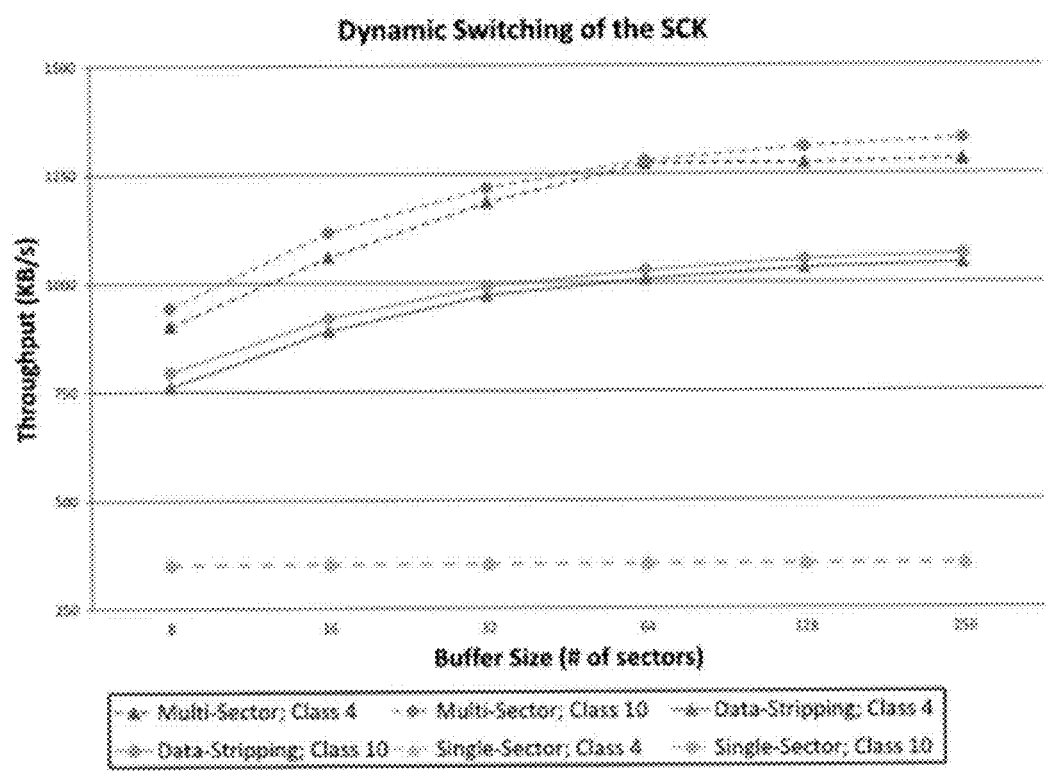
(b) 14.7456 MHz
Fig.19

SERIAL BUS INTERFACE TO ENABLE HIGH-PERFORMANCE AND ENERGY-EFFICIENT DATA LOGGING

This invention was made with Government support under Grant No. 70NANB9H9013, awarded by the National Institute of Standards Technology. The Government has certain rights in this invention.

FIELD

The embodiments described herein generally relate to a serial bus interface and more particularly, to a serial bus interface module that enables high-performance and energy-efficient data logging.

BACKGROUND INFORMATION

Flash-based storage devices are popularly used for long-term data logging since they have the following properties: cost-effectiveness, high capacity and low power. FIG. 1 shows the way the storage elements of a typical sensing platform are connected to the microcontroller unit (MCU) and sensor devices. Although serial flash and secure digital (SD) cards are capable of high I/O bandwidth, in practice, most data loggers for low-power sensing systems never achieve anywhere near the rated bandwidth and spend far more energy to write data in it. The bottleneck is not due to a single factor but a combination of the I/O architecture and scheduling. At the same time, the low-power requirement precludes the use of high-performance, parallel busses, and the high cost of making a custom integrated circuit (IC) limits the choice of MCUs to those commonly chosen for sensor nodes today. Therefore, any solution to overcoming the data logging performance of sensing platforms considered here must use the same existing serial peripheral interface (SPI) bus.

Although the SPI may be a bottleneck, it is not the only issue, as flash memory itself imposes wait cycles on page or block levels such that the MCU can be stalled for a long time if not scheduled carefully. For example, the multiple-sector write mode shows far better write performance than the single-sector write mode in an SD card as shown in the FIG. 2. To enable the multiple-sector write mode, it is required to allocate a large amount of internal SRAM included in the MCU; however, the low-power microprocessors cannot afford to allocate that large amount of internal SRAM as a buffer for the SD card. One may consider alternative non-volatile memory technologies such as FRAM, or MRAM, which consume low power, do not impose long wait cycles, and are byte-addressable as a replacement of the Flash-based storage devices. However, FRAM is much more expensive than flash, which has limited the use of FRAM to mainly storing configuration and short-term data as a replacement of EEPROM.

Hybrid-Storage

There have been efforts to adopt hybrid storage systems to make the best result out of the combination of different types of memory, although existing storage capabilities on sensor nodes are restricted to a single flash memory in most cases. Internal EEPROM included in the MCU is often used to store metadata for the file systems and snapshots. Since EEPROM allows writing a byte at a time, in-place updates and more reprogramming capability, it is more suitable for handling metadata that tends to be updated more often with a small amount of changes. However, the amount of EEPROM is very limited while the time to complete an operation to write a byte is very long (8.5 ms for a byte), which slows the overall write speed.

NVFAT, FRASH, and Chameleon suggest the use of more advanced non-volatile memory called FRAM. FRAM is byte-addressable for write operation and much faster than NAND flash or EEPROM; therefore, it is a good candidate to replace EEPROM for storing metadata. NVFAT modifies the VFAT file system in Linux to use non-volatile memory such as FRAM as a cache for metadata of the file system. FRASH is a file system dedicated to a flash memory. It differentiates itself from other flash file systems by using FRAM as metadata storage. Chameleon is a solid-state drive that adds FRAM to flash memory. Chameleon has an FTL to provide transparent access to flash memory by maintaining a mapping table keeping pairs of the logical address and physical address and some other metadata. Chameleon uses FRAM to store the metadata including the mapping table to boost the performance, since FRAM is good for small data update, whereas NVFAT and FRASH use FRAM as metadata storage for a particular file system. However, all of these require a large amount of expensive FRAM space and use FRAM as a part of the memory architecture rather than the storage. Therefore, these systems are not feasible to currently available sensor platforms.

Although the FRAM chips used for the above systems have parallel interfaces, FRAM chips are also available with serial interfaces such as SPI or I2C, which can be easily employed for sensor systems. Several sensor systems have adopted serial FRAM as a part of the hybrid storage system. MStore, an expansion board for sensor platforms such as Telos and Mica nodes, brings up multiple types of non-volatile memory chips. MStore provides SPI NOR flash, NAND flash, and SPI FRAM, all connected to the same SPI bus. The goal of MStore is to allow researchers to easily experiment with using the various types of memory chips. These three memory chips have different properties and can make good combinations for certain flash file systems for sensor platforms. However, MStore board requires large amounts of resources to be used for legacy file systems, and a direct transaction from a storage device to the other is not possible on SPI master-slave I/O architecture.

DuraMote employs a storage system consisting of an SD card and FRAM. DuraMote support FAT32 file system for logging data so that a PC can read data. The limited internal SRAM size of the MSP430 MCU included in the sensor system is shared by multiple tasks, and single-sector write mode is used to transfer data to the SD card. FRAM is solely used for configuration information and some critical data. Since the SD card and the FRAM are connected to the same SPI bus of the MCU, using FRAM as external buffer forces double transactions just like MStore.

Enhanced Master-Slave Bus Architecture

The master-slave bus architecture does present a flaw, namely the double transaction problem. The name comes from the fact that two transactions are needed to send data between two slave devices, because the protocol requires that the master be involved in every transaction and that one slave cannot directly communicate with other slaves. As a result, the maximum transfer rate between two slave devices is half of what the channel is physically capable of. Also, since the host MCU acts as a middleman in a transfer, it has to use resources to setup the transfer, buffer the data from the source slave, and funnel it back out to the sink slave. The technique of pipelining transactions through the use of multiple channels dedicated to the slave devices could parallelize the transfer, but it still takes up buffering space and does not save power.

Master-Handoff Protocol (MHP) addresses the double transaction problem with specialized protocol. In this protocol, the MCU becomes a slave and either the source or the sink device becomes a temporary master after the MCU issues a read command to the source slave device and a write command to the sink slave device. MHP can get rid of the double transaction involving multiple SPI slaves whose protocols can be programmed accordingly.

Paused-Switch Circuit (PSC) takes a hardware approach to addressing the double-transaction problem by providing a more flexible SPI controller to the MCU rather than introducing a new protocol. Unlike MHP, PSC can be applied to any currently available SPI devices without modifying their protocols.

To allow for two slave devices to transfer data, the master sets up the source and sink slave devices separately by issuing the respective read or write command code but pauses them before "splicing" their bulk data transfer phase. Neither the source slave nor the slave is aware of the fact that their data lines have been rewired to enable direct slave-to-slave transfer, because the master pauses the clock to one slave and leaves the chip-select asserted (or else the transaction will be aborted) while switching to setting up the other slave. Once the source and slaves are aligned in their transactions and the data-in/data-out lines are re-wired, slave-to-slave transfer can occur. This approach enables a master to use one single SPI controller to nearly fully utilize the SPI bus and eliminate the double-transaction problem. This approach can be accomplished with simple hardware support.

PSC proposes transaction splicing and source broadcast mode to handle the required steps. Transaction splicing allows the master device to be able to keep each chip-select pin asserted to prevent the transaction state from being reset while issuing a command to another slave, and to isolate each SCK line so that the master device can issue a command to a slave device individually even though the chip-select pins of all the slaves are asserted. Source broadcast mode allows a slave device to broadcast its data through its SPI output pin to all the input pins of other slave devices and the master by temporarily inverting the source-slave's slave-out (SO) signal to drive the MOSI bus signal. Since all the slaves' slave-in (Si) pins are connected to the MOSI pin of the master device, the source-slave SO signal is broadcast to all of the other devices including the master device.

Limitations of Currently Used Storage Compositions

First, sensor storage systems' logging performance is far behind the rated storage bandwidth provided by SD cards. Since the embedded MCU's cannot afford allocating enough memory out of the internal SRAM to enable multiple-page-write required to match the rated bandwidth, high sampling rates cannot be supported. Even if enough memory as write buffer to the SD card can be allocated, buffering in non-volatile memory may result in possible data loss by power failure.

Second, external fast non-volatile memory such as FRAM chips as write buffer can be added to offer enough space for buffering data instead of using them as metadata storage only. However, the double transaction problem took place when the buffered data in the FRAM chips is flushed to the SD card. To flush buffered data from FRAM chips to the SD card, two identical data transactions have to be performed due to the master-slave bus architecture. These double transactions incur more CPU time and memory for transactions as well as more time on transfer time.

Third, the ideas such as MHP and PSC to address the double transaction problems can be used but each of them imposes problems. While MHP works for MCU-based slaves, it is not possible for many slave peripherals whose protocols are hardwired. In addition, a clock generator has to be equipped in each slave device, which increases not only the hardware complexity but also the power consumption. PSC is not able to handle multiple numbers of transactions simultaneously on the same bus, which eventually blocks data transmission from MCU to any slave device on the master-slave bus while a slave-to-slave transaction is being performed. Additionally, the CPLD that is used for implementation consumes too much power and it is not realistic to waste that much power only for the controller to get rid of the double transaction problems.

Fourth, energy consumption for sensor systems is always one of the most important issues. In fact, sensing systems are deployed in remote places where no constant power source is available and wireless transmission is limited, for example, water pipes in manholes. Even though alternative power sources like solar panels can be used, it is always a requirement that energy consumption be minimized to guarantee reliable data aggregation. The single-page-write mode has been found to not only lowers the storage bandwidth, but also incur a lot higher energy consumption.

Therefore, it is desirable to provide serial bus with improved performance and efficiency.

SUMMARY

The embodiments provided herein are directed to a new serial bus interface module (SBIM) that enables constrained sensor systems to better match flash-based storage devices' (SD card) read and write performance. The SBIM augments existing flash-based storage with non-volatile random-access memory to form a hybrid storage system using the most popularly used master-slave bus architecture. Together with PSC-like features, the serial bus interface module not only enables slave-to-slave transfer (therefore eliminating the double-transaction problem) but also reads caching (one source to multi-sink) and buffering while flushing. These transaction types enable multi-sector write for significantly faster speed and lower energy overhead, while the use of non-volatile memory for metadata caching means low risk of file-system corruption in the event of power failure. The serial bus interface also enables the direct data transfer from sensors to storage or communication modules without requiring the microprocessor's intervention.

The systems, methods, features and advantages of the invention will be or will become apparent to one with skill in the art upon examination of the following figures and detailed description. It is intended that all such additional methods, features and advantages be included within this description, be within the scope of the invention, and be protected by the accompanying claims. It is also intended that the invention is not limited to require the details of the example embodiments.

BRIEF DESCRIPTION OF THE FIGURES

The accompanying drawings, which are included as part of the present specification, illustrate the presently preferred embodiment and, together with the general description given above and the detailed description of the preferred embodiment given below, serve to explain and teach the principles of the present invention.

FIG. 6(a) is a schematic of the SBIM illustrating a flushing (slave to slave) transaction supported by the SBIM.

FIG. 6(b) is a schematic of the SBIM illustrating a read caching (one-source to multi-sink) transaction supported by the SBIM.

FIG. 6(c) is a schematic of the SBIM illustrating a buffering while flushing (simultaneous) transaction supported by the SBIM.

FIG. 10 is a schematic illustrating a system overview of the SBIM.

FIG. 11 is a schematic illustrating the architecture of a SPI bus controller channel.

FIG. 16 includes photographs of actual implementations of the SBIM.

FIG. 19 includes charts corresponding to the Sequential write throughput.

Figure 1:
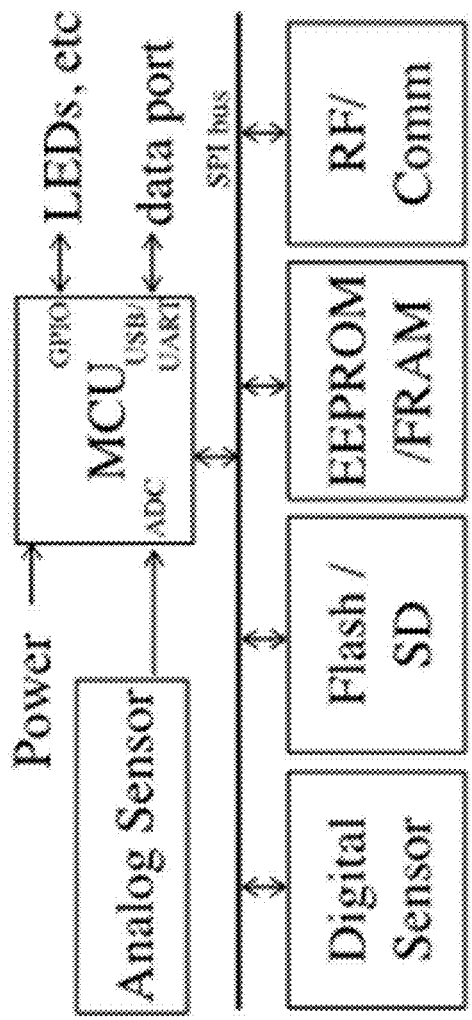
FIG. 1 is a schematic of a typical sensor platform with storage.
Figure 2:
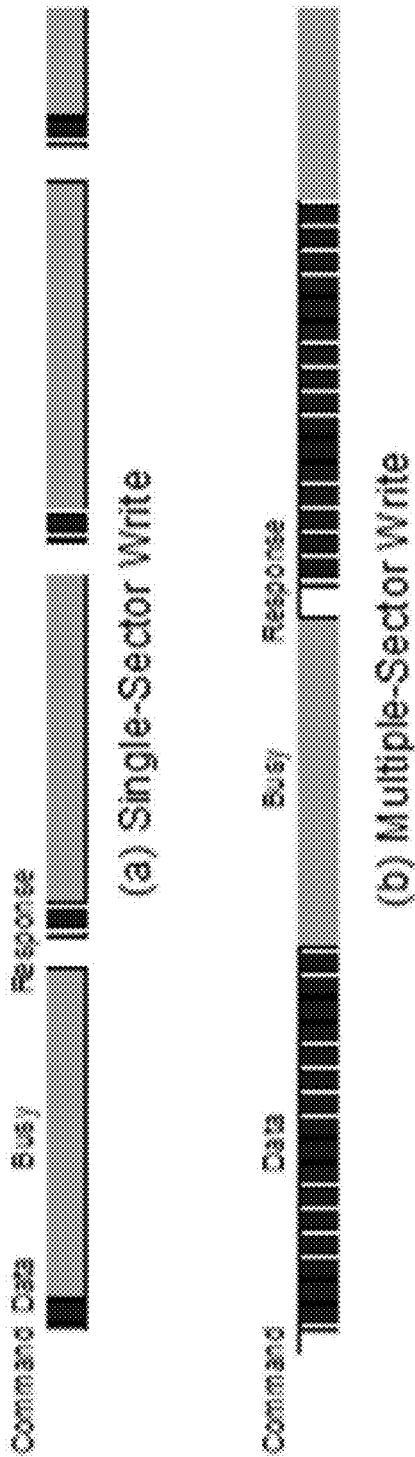
FIG. 2 is an illustration showing (a) single-sector write mode vs. (b) multiple-sector write mode.

It should be noted that the figures are not necessarily drawn to scale and that elements of similar structures or functions are generally represented by like reference numerals for illustrative purposes throughout the figures. It also should be noted that the figures are only intended to facilitate the description of the various embodiments described herein. The figures do not necessarily describe every aspect of the teachings disclosed herein and do not limit the scope of the claims.

DESCRIPTION

The embodiments provided herein are directed to a new serial bus interface module (SBIM) that enables constrained sensor systems to better match flash-based storage devices' (SD card) read and write performance. The serial bus interface module augments existing flash-based storage with non-volatile random-access memory to form a hybrid storage system using the most popularly used master-slave bus architecture. Together with PSC-like features, the serial bus interface module not only enables slave-to-slave transfer (therefore eliminating the double-transaction problem) but also reads caching (one source to multi-sink) and buffering while flushing. These transaction types enable multi-sector write for significantly faster speed and lower energy overhead, while the use of non-volatile memory for metadata caching means low risk of file-system corruption in the event of power failure. The serial bus interface also enables the direct data transfer from sensors to storage or communication modules without requiring the microprocessor's intervention.

The embodiments provided herein include two distinct features. First, a dedicated double-banked FRAM buffer is utilized to free up the internal SRAM of the MCU, to allow fast multi-sector write mode of an SD card, and to also serve as a metadata cache for the file system. Second, a programmable IO bus controller is provided that enables multiple simultaneous SPI transactions between all types of SPI devices. The combination of these features results in the SBIM, which is a serial storage interface that can easily be added to virtually all existing sensor nodes via their built-in SPI to enable high-performance, low-power data logging.

Interface Architecture

Figure 3:
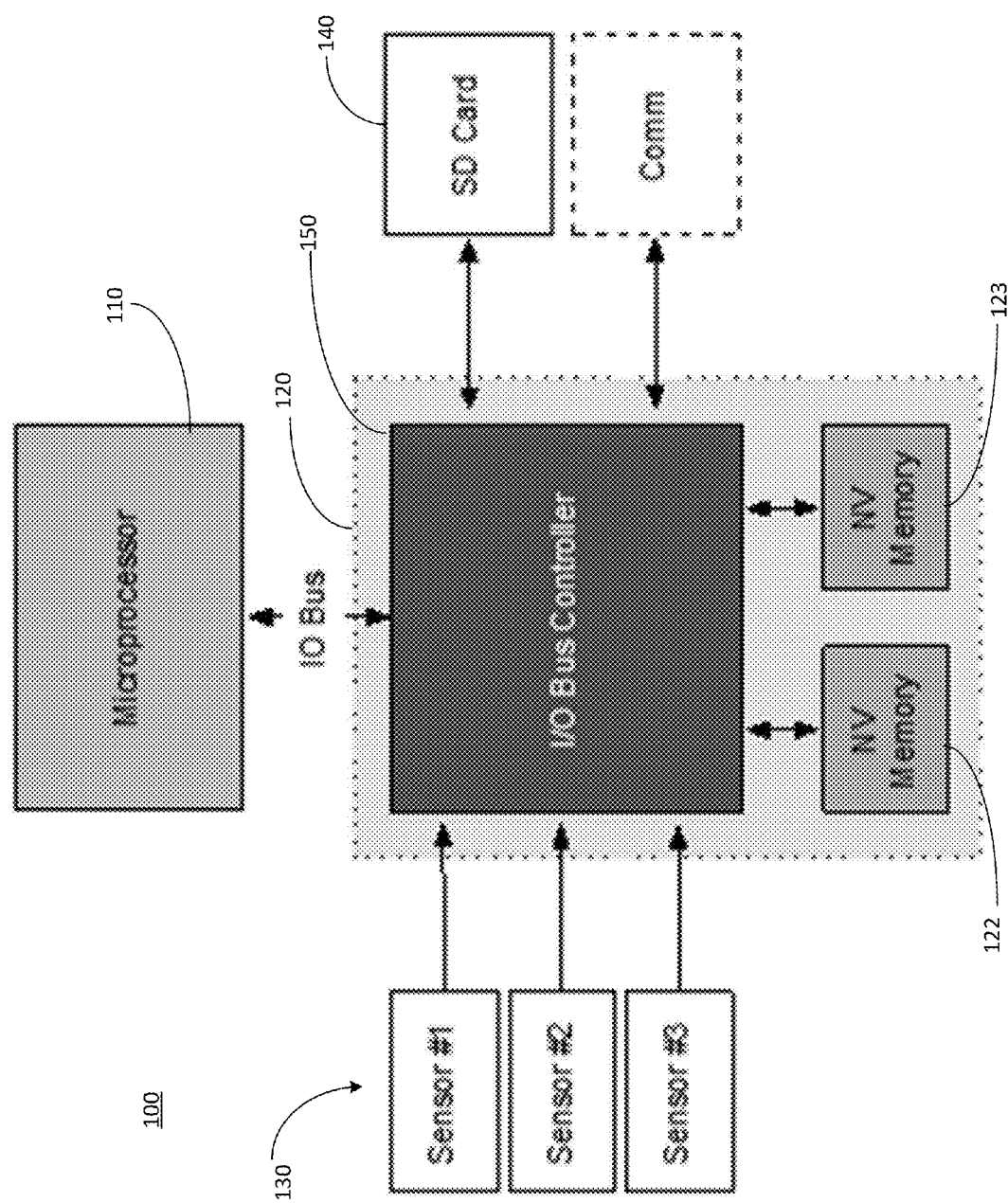
FIG. 3 is a schematic of a data acquisition system based on an embodiment of a serial bus interface module (SBIM).

FIG. 3 illustrates a sensor system 100 with the SBIM or storage interface 120 installed. The master-slave storage interface architecture consists of non-volatile external buffers and a dedicated I/O bus controller 150 to enable the transactions required for the storage devices 140 and connected sensors 130.

External non-volatile buffers such as FRAM and MRAM are not limited to be used as metadata storage; however these can enable the multi-sector write mode for data to be stored in the flash-based storage devices like SD cards. The SBIM 120 is integrated with two symmetric buffer memory devices 122, 123 to permit the ability to continuously buffer data; that is, one of the buffers can be used for buffering data while the other is flushing data to the SD card 140.

The dedicated I/O bus controller 150 is capable of routing data and splicing transactions between connected devices. The I/O bus controller 150 allows any source device to be connected to any number of desired sink devices. Multiple individual single-source-multi-sink data paths can be created as a result. It also provides transaction splicing, which allows the host the ability to modify and setup each bus transaction before any data is exchanged. This functionality is easily controlled by the host MCU via simple commands transmitted over the same I/O bus rather than having to use a dedicated control I/O.

Slave Interface

Figure 4:
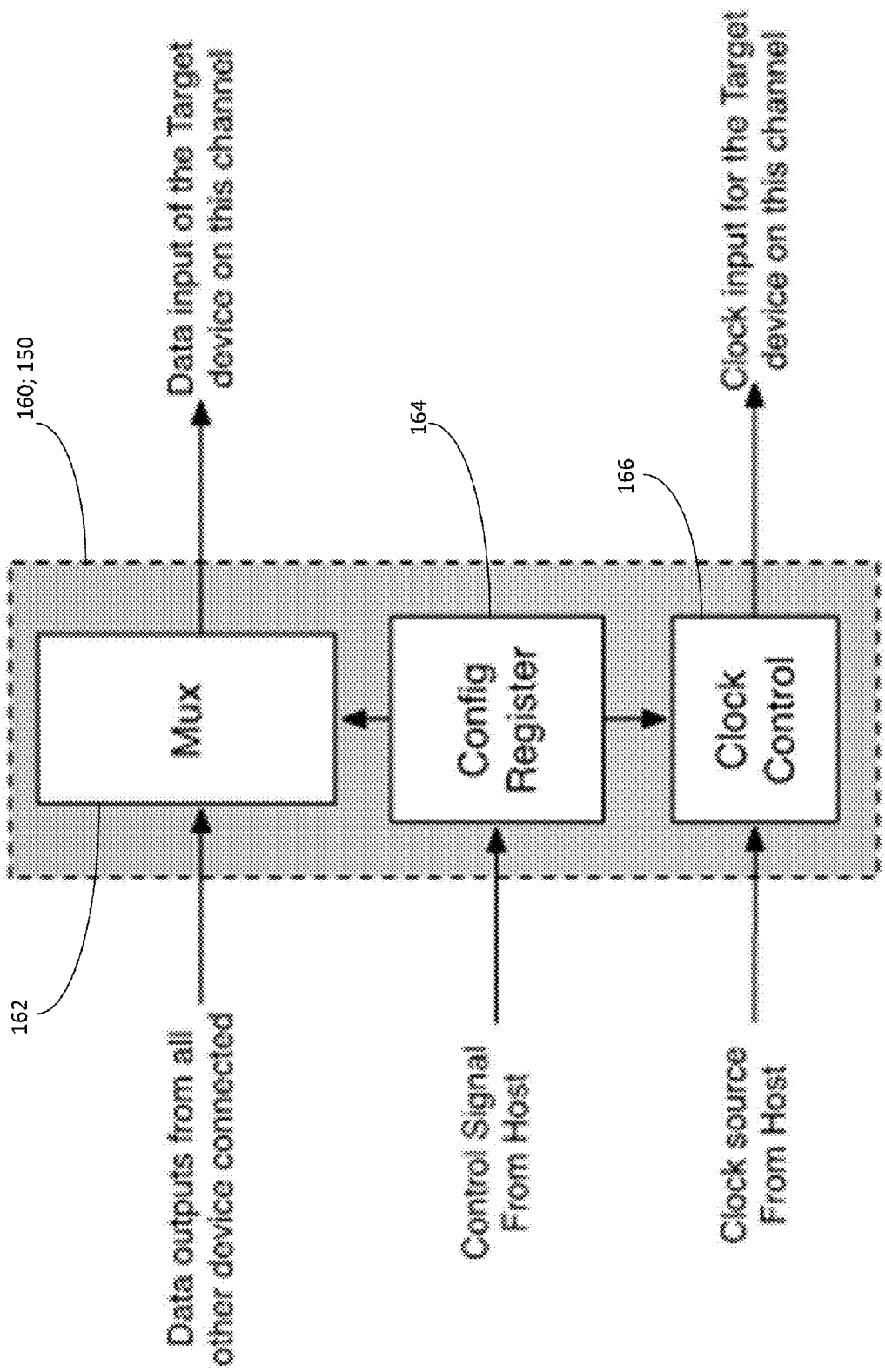
FIG. 4 is a schematic of a structure of a slave interface in an I/O bus controller of the SBIM.

FIG. 4 illustrates the conceptual structure of a single channel 160 for a slave device in the dedicated I/O bus controller 150 and the I/O bus controller consists of multiple channels. The host can configure each channel by loading corresponding configuration to the configuration register 164. Some portion of the bits in the register 164 are used to select the data source for the data-in of the target device while the rest are used to turn on and off the clock signal with the clock control 166 to pause and resume the data transfer to the target device and to perform transaction splicing. Since the data outputs from all other devices connected to the I/O controller are injected to the multiplexer 162, it is possible to make a data path from any source to the corresponding target whether the selected source is the master-device or one of slave-devices. Slave-to-slave transactions can be performed by injecting clock signals from the host after selecting one of the data-out signals from slave devices on the multiplexer 162. The dedicated I/O controller contains multiple channels; therefore, more complex transactions such as single-source-multi-sink transactions and simultaneous transactions can be realized.

Host Computer Interface

The host computer interface of the I/O bus controller has a similar structure of the slave interface. The only difference is the lack of the clock control, since the host computer provides the clock signals to the slave devices. The I/O bus controller must be able to provide the following functions:

To control the clock input for all the slave devices

To link/unlink two devices by selecting one of the data-out signals from other channels to link it to the data-in of the device connected to the corresponding channel The configuration registers that hold the information regarding the above functions should be configured through either a designated programming port or the I/O bus data input. The former one requires several extra pins on the I/O bus while the latter one needs one or two pins to change the mode of the I/O bus controller from the programming mode to the data transaction mode or vice versa.

Supported Transactions

Figure 5:
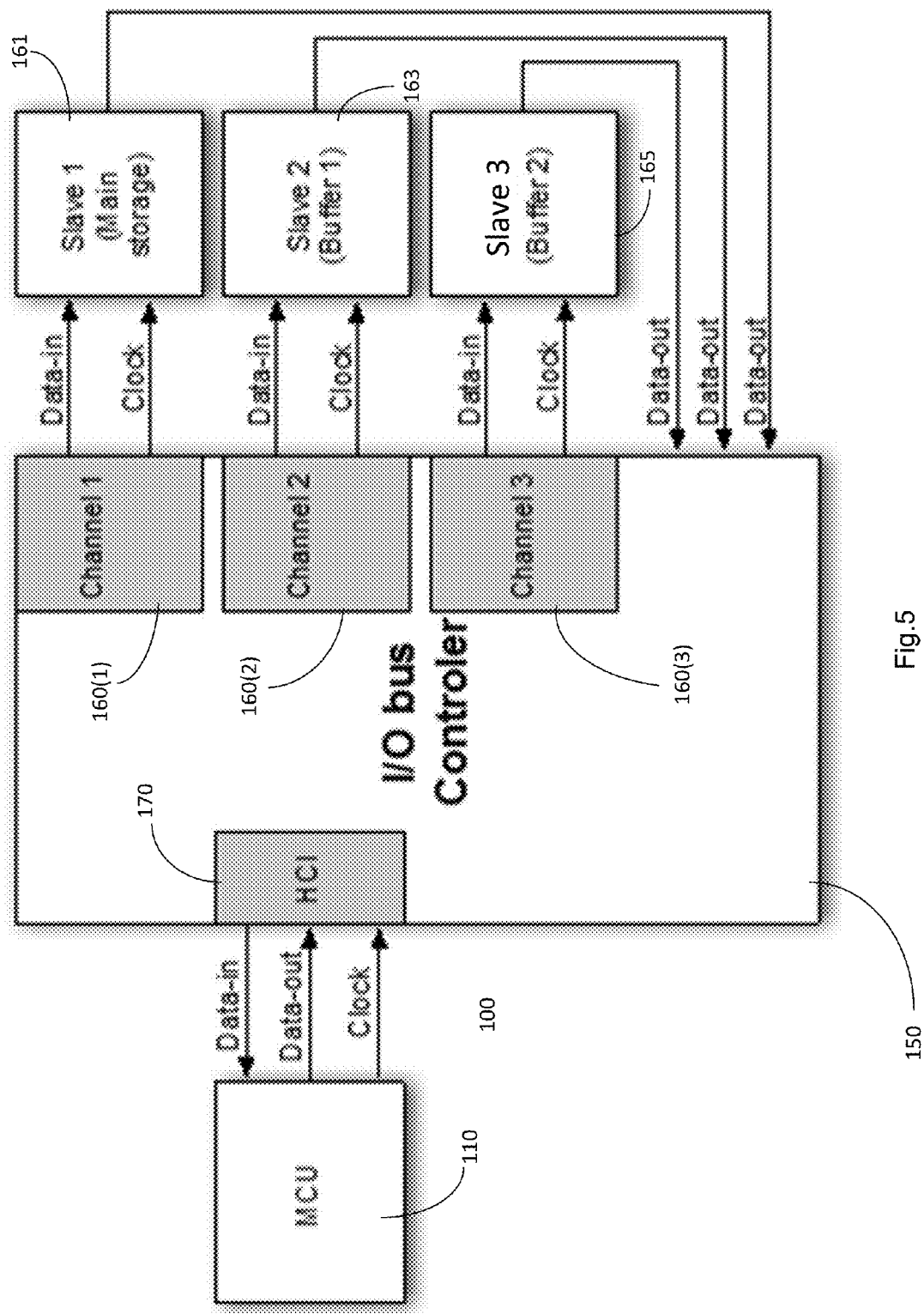
FIG. 5 is a schematic of a typical master-slave bus device topology with a dedicated I/O controller.

Attempts to perform a slave-to-slave data transfer on a regular master-slave I/O architecture such as SPI or USB requires two transactions for the same data. For example, to flush the buffered data from an external non-volatile memory to an SD card, the data must be transferred to the master device, which then must transfer the data back out to the SD card. FIG. 5 shows a typical topology that can be done with the dedicated I/O bus controller 150. As depicted, the I/O bus controller 150 includes multiple channels 160(1), 160(2) and 160(3) to interface with multiple slaves 161, 163 and 165. A host computer interface (HCI) 170 interfaces with an MCU 110. Since slave-to-slave transactions and simultaneous transactions on the same bus are not allowed, the I/O bus controller must provide ways to perform such transactions for efficient data transactions.

Flushing

Once the amount of buffered data reaches a certain amount, flushing needs to be performed. This operation requires a slave-to-slave transaction and incurs a double transaction penalty. This would not be an issue if the said slave devices, in this case the SD card 140 and the non-volatile memory 122, were able to transfer data between themselves as shown in FIG. 6(a). The dedicated I/O bus controller 150 eliminates this problem by directly connecting the slave devices.

Figure 7A:
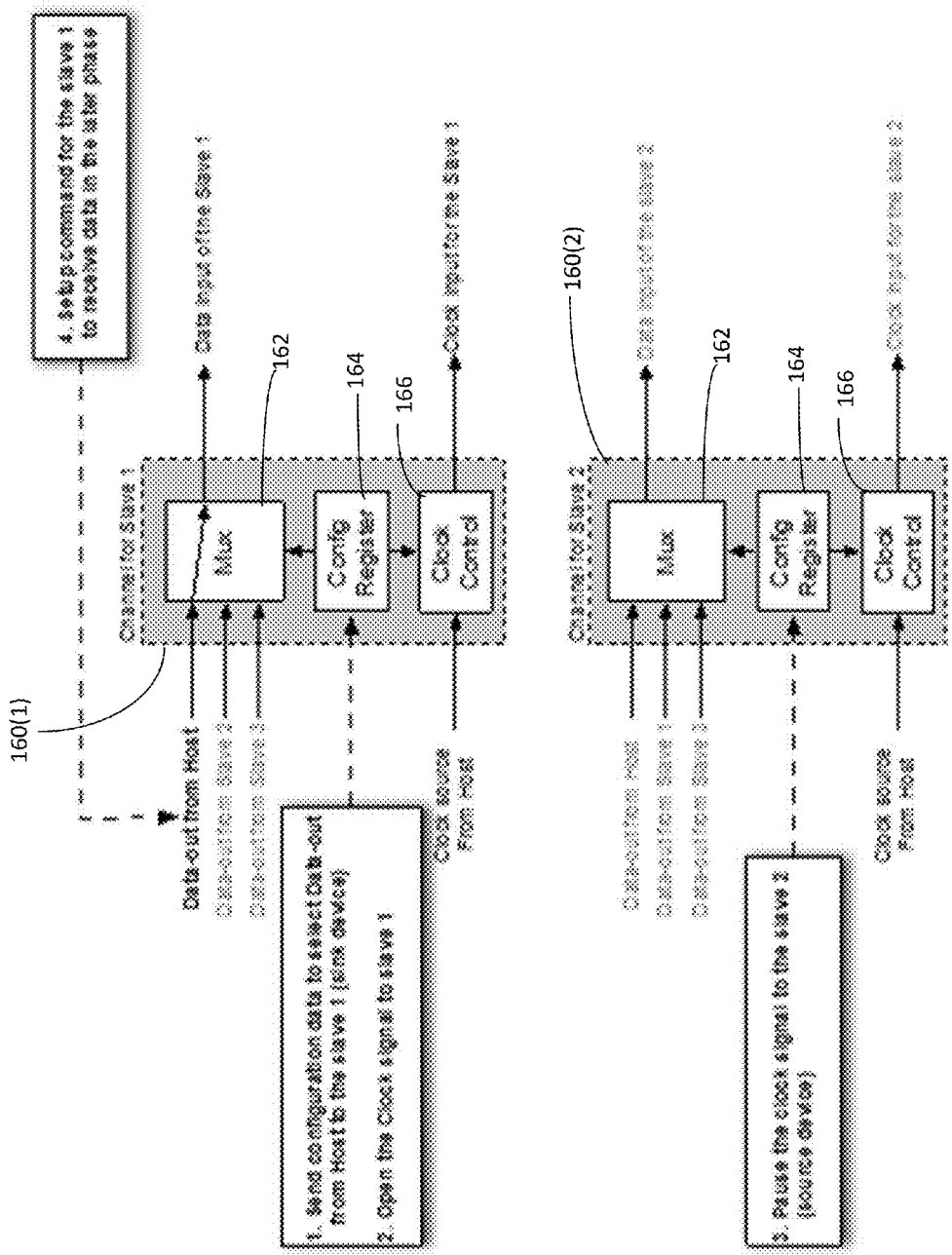
FIG. 7(a) is a schematic illustrating the step of setting up a sink slave device to perform a slave-to-slave transaction using the I/O bus controller of the SBIM.
Figure 7B:
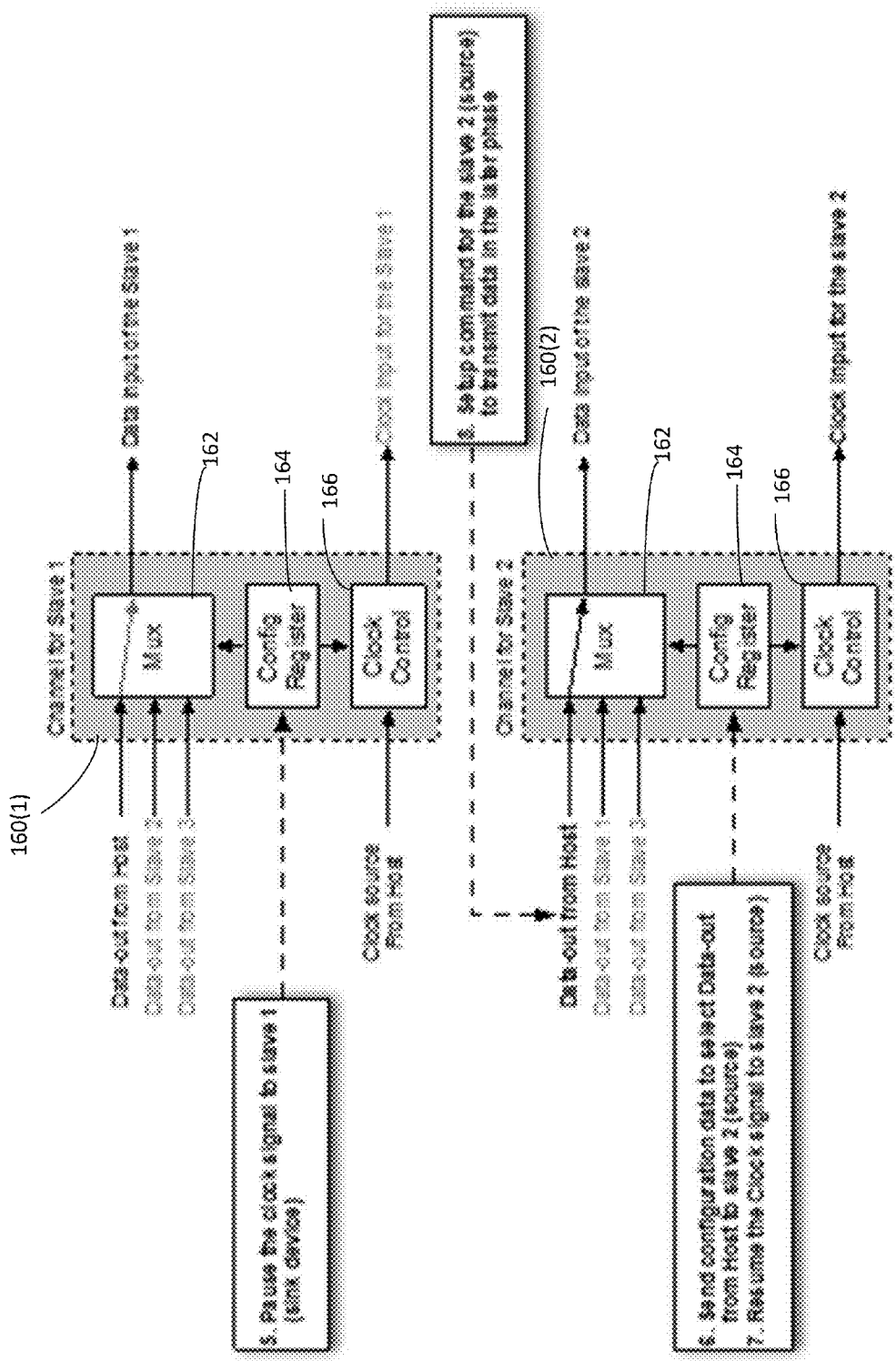
FIG. 7(b) is a schematic illustrating the step of setting up a source slave device to perform a slave-to-slave transaction using the I/O bus controller of the SBIM.
Figure 7C:
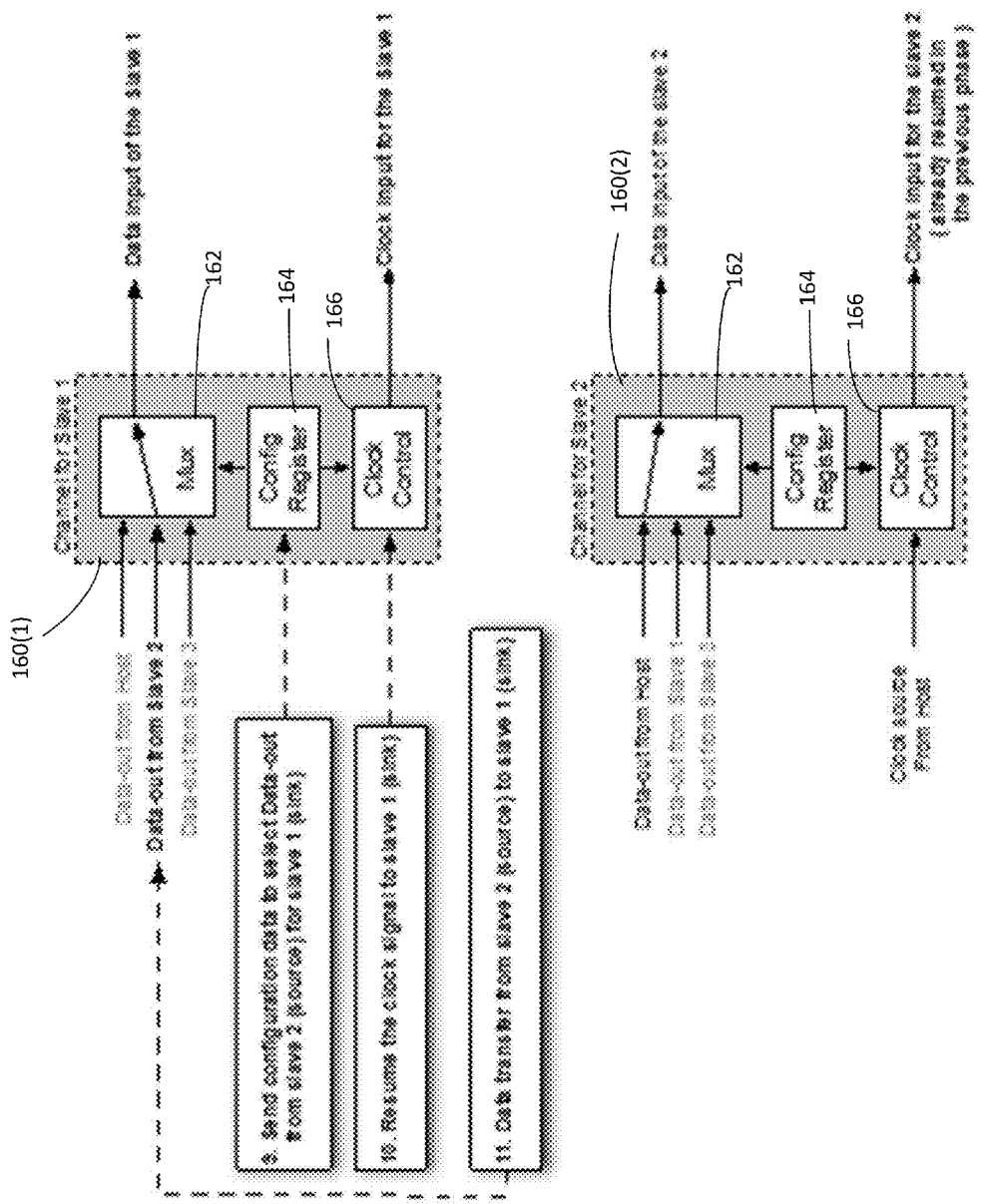
FIG. 7(c) is a schematic illustrating the step of direct data transfer from the source slave to the sink slave in a slave-to-slave transaction using the I/O bus controller of the SBIM.

The FIG. 7(a) illustrates how the I/O bus controller 150 enables the direct data transfer from a slave device to another slave device. In the first phase, the channel 160(1) for the sink slave is configured to receive data-out signals from the host MCU. At this point, it is critical to pause the clock signal to the other slaves. Otherwise, the other devices can be configured or programmed in a wrong way. Once the sink slave is setup, the second phase should be performed the same way as the first phase, however the clock signals to all devices except for the source slave device must be paused in this phase. After both sink and source slave devices are set up, the data path from the source slave to the sink slave can be made by configuring the configuration register 164 to select the data-out signal from the source slave out of the data-out signals injected to the multiplexer 162. The sink slave's data-in pin is now connected with the data-out of the source slave and the data from the source slave can be delivered directly by resuming the clock signal for the source and sink slaves. Supposing the SD card and a buffer device are the sink and source slave devices respectively, flushing data directly from a buffer device to the SD card can be performed with the I/O bus controller. The FIG. 7(b) shows the sequence required to perform a slave-to-slave transaction.

Read Caching

To better handle small and frequent updates, efficient read caching is required. Typically, only a small portion of a sector needs to be updated during normal activity. To efficiently handle these partial sector updates, the external buffer is used as a read cache. The SD card should be able to transfer data to both the external non-volatile buffer and the MCU at the same time; otherwise, another type of double transaction problem occurs, in which the metadata must be moved from the SD card 140 to the non-volatile memory to the MCU. The dedicated I/O bus controller 150 allows the metadata to be sent to the non-volatile memory 122 and the MCU 110 simultaneously, eliminating this type of double transaction problem, as illustrated in FIG. 6(b).

Figure 8:
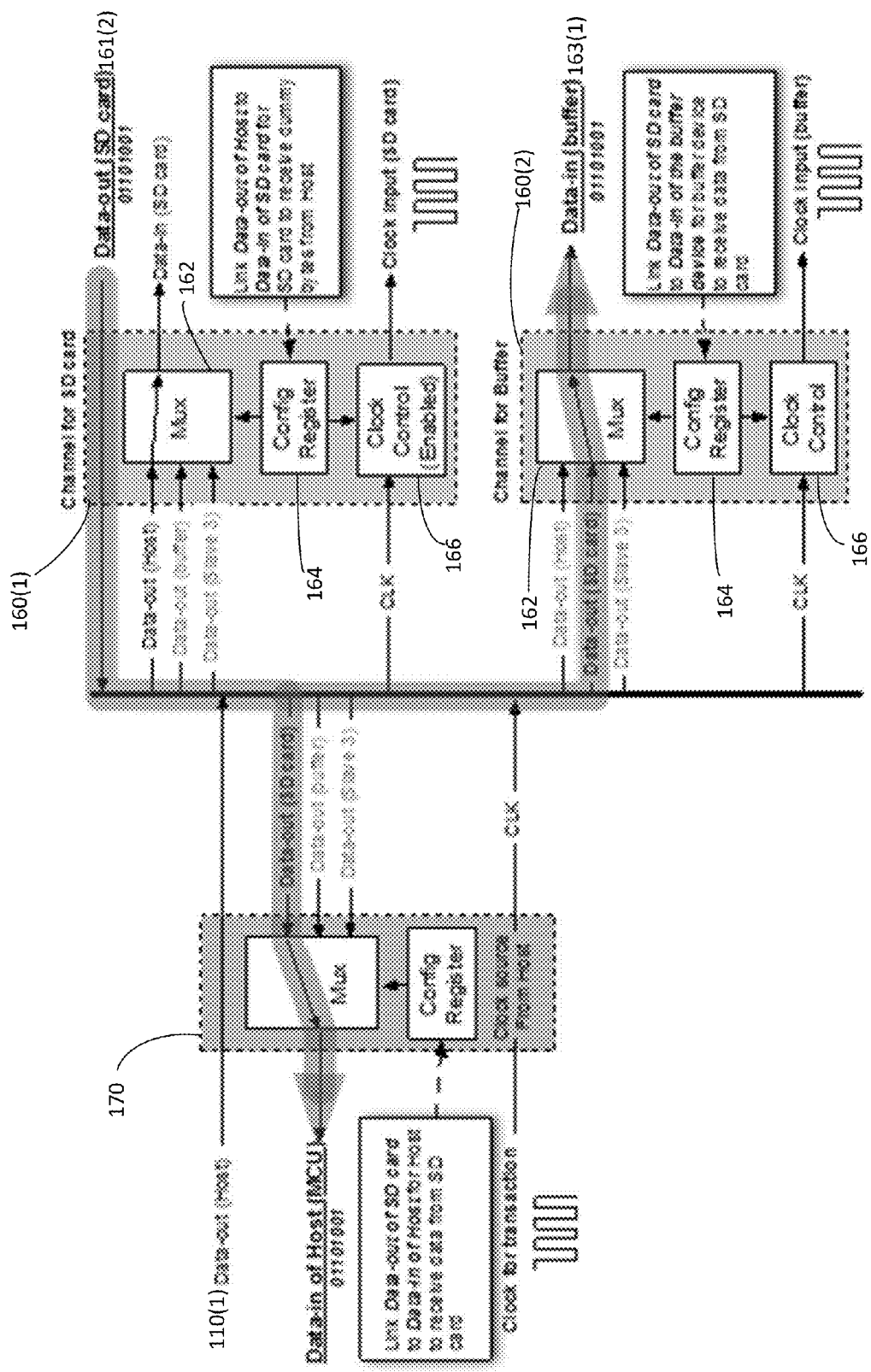
FIG. 8 is a schematic illustrating a single-source-multi-sink transaction on the configured SBIM.

As shown in FIG. 8, the I/O controller allows the SD card to transmit data to both the host and the buffer device at the same time by linking the data-out 161(2) of the SD card to the data-in of the host 110(1) and the data-in 163(1) of the buffer device after the setup phases. FIG. 8 displays the steps required to perform efficient read caching with the external buffer.

Once the metadata is cached in the external buffer, the MCU no longer needs to read or update the data block in the SD card. Instead, the MCU reads and updates the cached metadata in the external buffer. The updated cached metadata can be flushed afterwards when either the metadata section in the external buffer is full or the corresponding file is closed.

Buffering while Flushing

Buffering should be allowed even while the data is being flushed, otherwise, new data has to be buffered in the SRAM, which would soon overflow due to the limited size of the memory. Therefore, one of the external buffer devices must be used as a buffer while the other is busy with flushing. Thus, the transactions from an external buffer device 122 to the SD card 140 and the transaction from the MCU 110 to the other external buffer device 123 have to be performed simultaneously as shown in FIG. 6(c). Therefore, the dedicated I/O bus controller should be able to create multiple independent paths between the connected devices.

Figure 9:
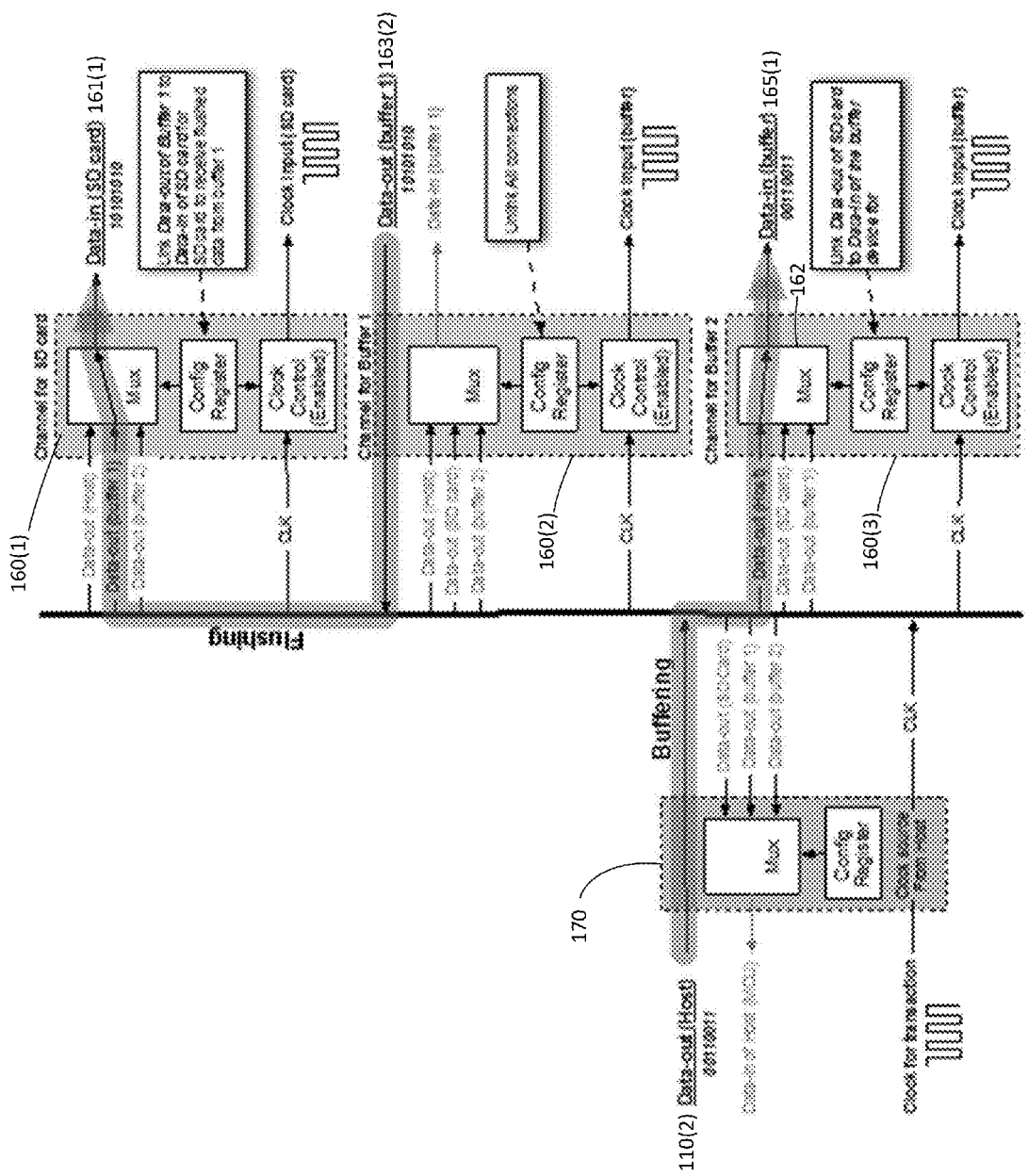
FIG. 9 is a schematic illustrating a process of buffering while flushing on the configured SBIM.

The FIG. 9 shows how the buffering and flushing can be done at the same time. The I/O channel 160(1) for the SD card is set to receive the data-out signal from one of the buffer devices so that the data buffered in the buffer device can be flushed to the SD card. In the meantime, the other buffer device can be ready to receive data from the host computer by selecting the data-out from the host among the inputs of the multiplexer 162 connected to the data-in 165(1) of the buffer device. Since the data paths for flushing and buffering are separate from each other, the two transactions can be performed simultaneously. As shown in FIG. 9, the I/O controller allows the host to transmit data to the buffer device by linking the data-out 110(2) of the host to the data-in 165(1) of one buffer device and allows the other buffer device to transmit data to the SD card by linking the data-out 163(2) of the buffer device to the data-in 161(1) of the SD card.

Implementation—Hardware

As depicted in FIG. 10, the hardware layer of the SBIM 220 preferably includes two FRAM chips 222, 223, a MicroSD Card slot and a dedicated SPI bus controller module 250. The CPLD is separated from the FRAM and MicroSD Card so that it can easily be used with other SPI devices, as shown in FIG. 10. The FRAM chips can be easily replaced with other memory type such as MRAM if the memory chips provide SPI ports. FRAM chips with SPI ports were used because FRAM chips currently consume lower power than MRAM chips. The SBIM uses FRAM as a non-volatile write buffer to enable fast multi-block write mode and a read buffer to effectively handle small updates such as metadata updates. However, the multi-block mode incurs a long time to flush and new data cannot be buffered during flushing. The SBIM's two integrated FRAM chips make it possible for data to be buffered to without having to wait for the completion of flushing. While data buffered in one of the two FRAM chips is being flushed, the other FRAM chip can be used for buffering new incoming data.

The SPI bus controller 250 preferably supports up to seven slave devices, with two channels assigned to the FRAM chips and one channel to the SD card. The remaining four SPI ports can be used for any other desired slave devices. The number of supported channels can be increased by selecting a CPLD or FPGA that comes with more I/O's.

FIG. 11 illustrates the structure of a channel 260 in the SPI bus controller 250. Each channel has a multiplexer 262 that is used to connect each device's input and output ports to each other, enabling full direct connectivity between all devices connected on the bus. With this multiplexer 262, any SPI device's output can be connected to one or more other SPI devices' inputs as desired. This is unlike the PSC's source broadcast mode, which is only able to send data to one or all of the other SPI devices. Multiple linked sets of SPI devices can be created, and independent data transactions can be performed simultaneously. By asserting the SCK_Pause signal pin on a channel, the SPI bus controller pauses the SCK (clock generated from the MCU) signal headed to the target device so that the signals for other devices do not affect it, even if its chip select pin is asserted.

Each channel of the proposed SPI bus controller has a register that holds the SCK pause state, the chip select assertion state and the source device address. Pausing the SCK, asserting the connected device and linking the output of the desired source device to the connected device can be done via SPI transactions during the program mode. The proposed SPI bus controller enters the program mode once the PRGR pin is asserted. This architecture enables the use of the inherent fast data transfer speed of SPI to control the target devices, and allows for easier system expandability in the future, since the number of supported devices is no longer tied to the amount of GPIO pins a MCU has available.

Figure 12:
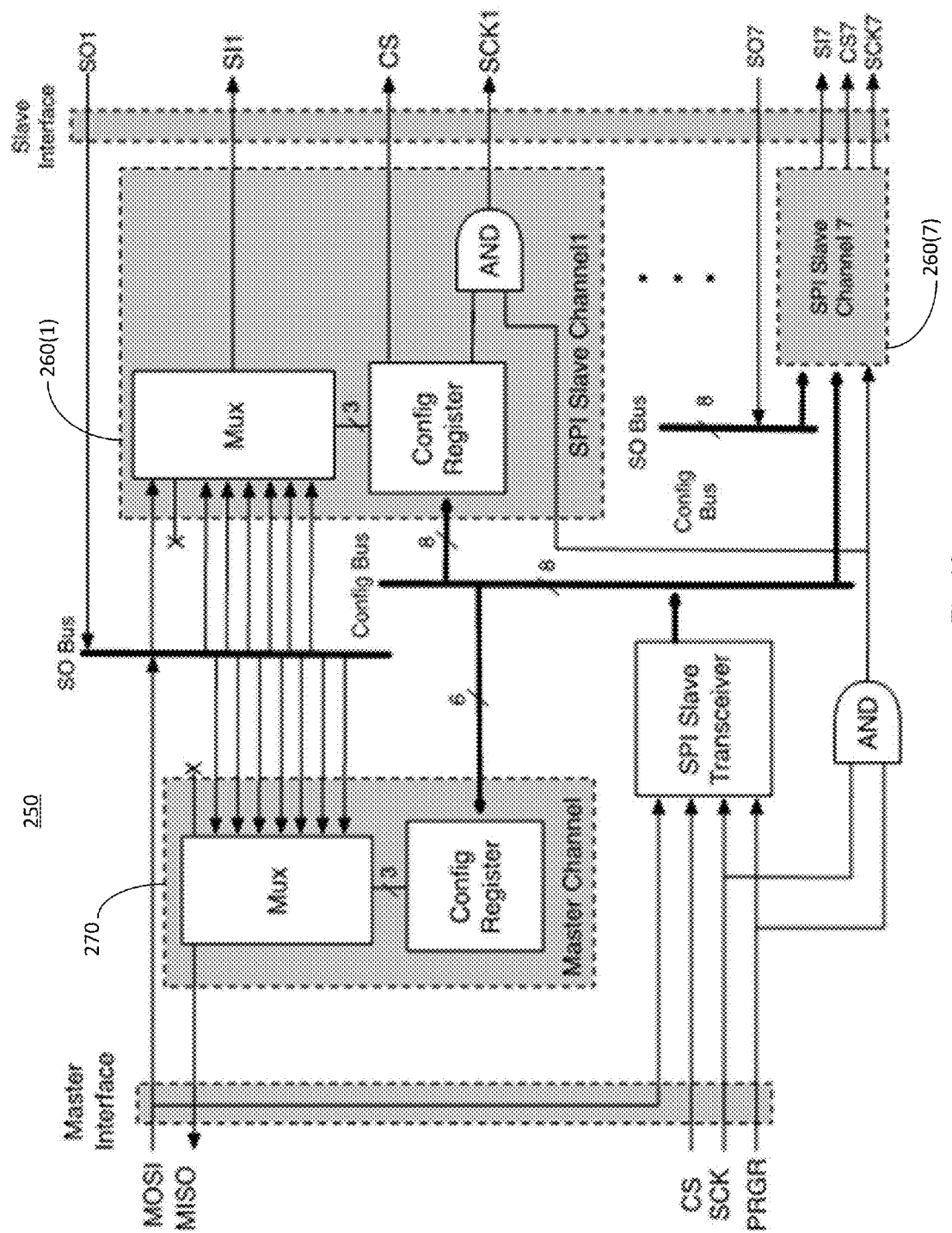
FIG. 12 is a schematic illustrating the structure of the SBIM.
Figure 13:
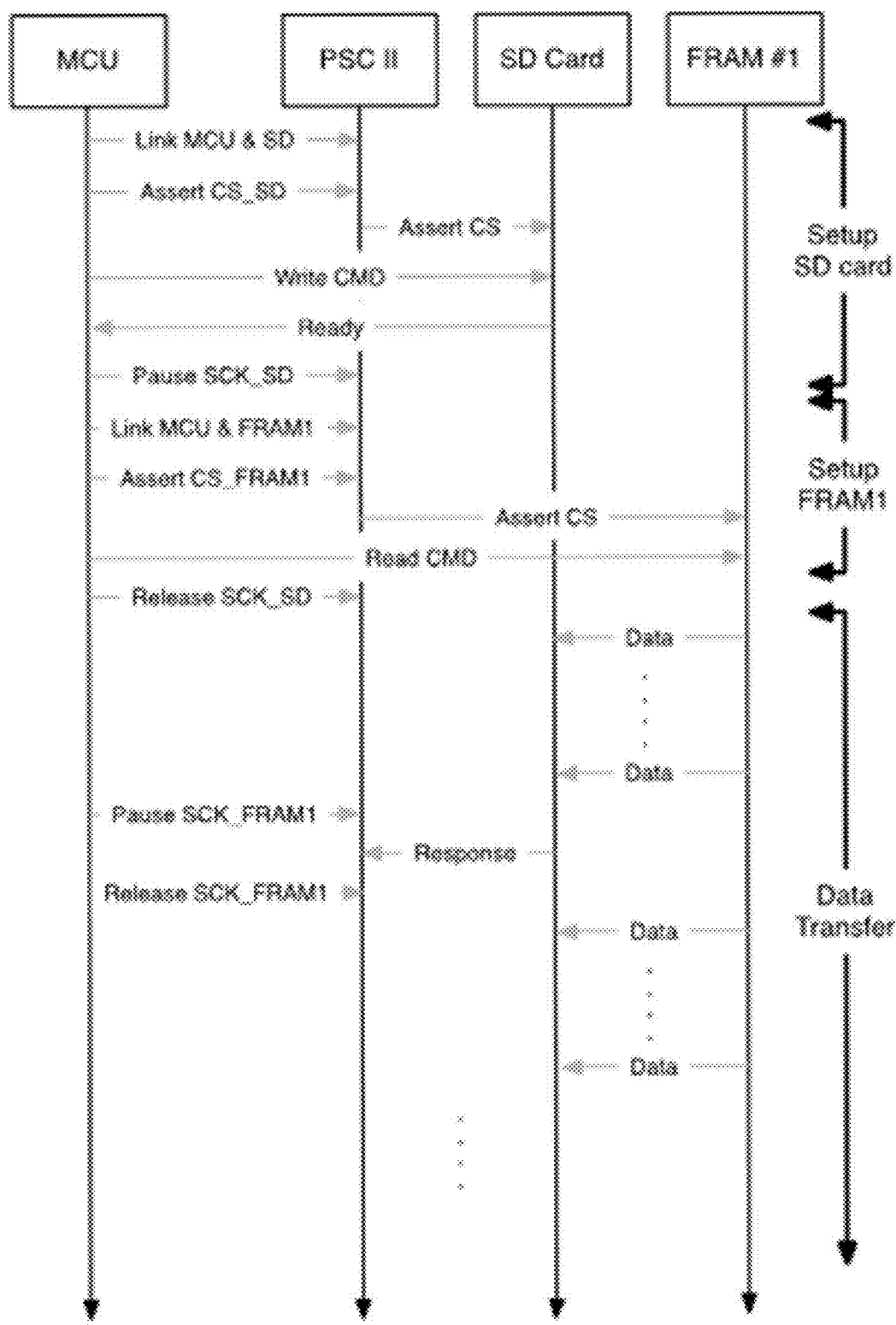
FIG. 13 is a flow diagram illustrating a procedure to flush data from a FRAM chip to the SD card using the SBIM.

FIG. 12 depicts the architecture of the SPI bus controller 250 with 7 slave channels 260(1) . . . 260(7) and 1 master channel 270. The SPI bus controller realizes the transactions required for efficient transfer between storage devices. For example, for the SPI bus controller to provide direct slave-to-slave communication, the SPI bus controller must setup and prepare each device for a transfer separately before commencing communication. To initialize a transaction, the bus controller activates the first device and sends a transaction setup command. After the setup of the first device completes, the bus controller must keep the assert line active during the setup of the second device, otherwise the device will reset its transaction state and cancel the operation. At this time, the controller asserts the second device and prepares it for the upcoming transaction by sending another transaction setup command. To prevent the first device from being affected, the SCK signal to the first device must be paused. When the setup of the second device completes, the controller connects the output of the first device to the input of the second device, then releases the SCK to the first device. It is at this point that the slave-to-slave data transfer begins. This process is illustrated as a flushing example between an FRAM chip and an SD card in FIG. 13.

The SPI bus controller ultimately plays the role of a gateway or router to the connected storage devices. All of the transactions pass through the bus controller to reach the target storage devices. Since all configurations are programmable via pure SPI transactions, all the SPI slave devices can be seen as a single device from the perspective of the MCU.

Hardware Abstraction Layer (Software)

The software layer (HAL) performs underlying operations such as flushing, and buffering to FRAM to provide transparent access to the slave devices through the SBIM.

Buffer Management

The HAL manages the buffering of data to the FRAM before flushing it to the SD card. To flush an FRAM, the FRAM address is mapped to its intended SD card address. An SD card uses sector-level addresses to access its data, but a mapping table containing pairs of sector-level address requires a significant amount of memory space. To reduce the memory requirement for the address-mapping table for the new storage system, the block-level mapping that is commonly used in the low-end FTL is used to manage the FRAM buffer.

On each write request, the HAL keeps track of the block where the requested sector belongs and checks if the block is full. Once the block is full, the HAL performs flushing operation on that block. During the flushing operation, the HAL utilizes simultaneous transactions enabled by the SPI bus controller to buffer if there are sector write requests. If data striping is enabled, the HAL must always check for a new write request before a segment of striped sector is flushed.

The HAL allows the host system to change the block size so that it may be optimized for its specific usage. Also, to further boost the write performance that multi-page writing provides, pre-erasing is done by the HAL before data is flushed from an FRAM to the SD card.

Data Striping

Figure 14:
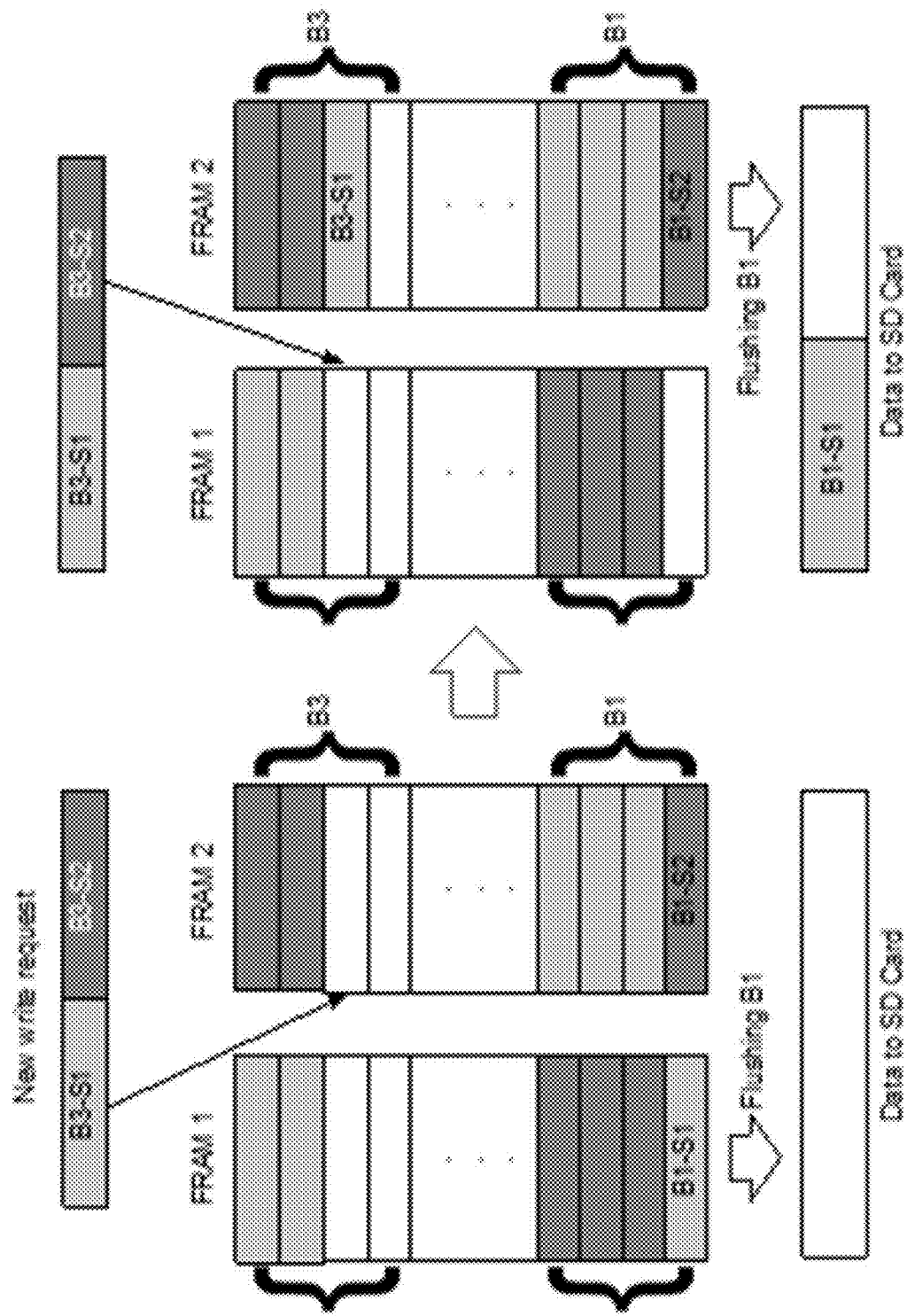
FIG. 14 is an illustration showing buffering while flushing on striped FRAM buffers.

Since block level mapping is used to manage the FRAM buffer, the data to be buffered may belong to the block allocated to the FRAM chip whose data is being flushed. In this case, we return to the issue of having to wait for one of the FRAM chips to finish flushing arose despite using double-banked FRAM. To reduce the wait time for an FRAM to flush data to the SD card, HAL provides an option to enable data striping. A sector is divided into an even number of segments and stored on different FRAM chips with the information about the segments stored in a reserved area of the FRAM. When a block is flushed, the two FRAMs are continuously switched between each other to reconstruct the sectors of the block as shown in FIG. 14. The worst-case waiting time to buffer data is now the maximum amount of time needed to flush a segment from the FRAM to the SD card, instead of the time it would take to flush an entire block if data striping is not used.

HAL Metadata

The FRAM buffer is managed on the block level, with the first block assigned to hold the metadata for the rest of the FRAM buffer. This means that no SRAM space is used for the metadata storage.

The metadata itself contains entries that hold information regarding buffered blocks such as SD card addresses, sector status bits, and striping information. The SD card address is where the block will be written to on the SD card when it is flushed from the FRAM buffer. A buffered sector bit indicates whether or not the sector has been completely buffered. A flushed sector bit indicates whether or not the sector has been completely flushed. Lastly, the striping information represents which segment of the sector is stored on the FRAM chip.

Enhanced System with the SBIM

Figure 15:
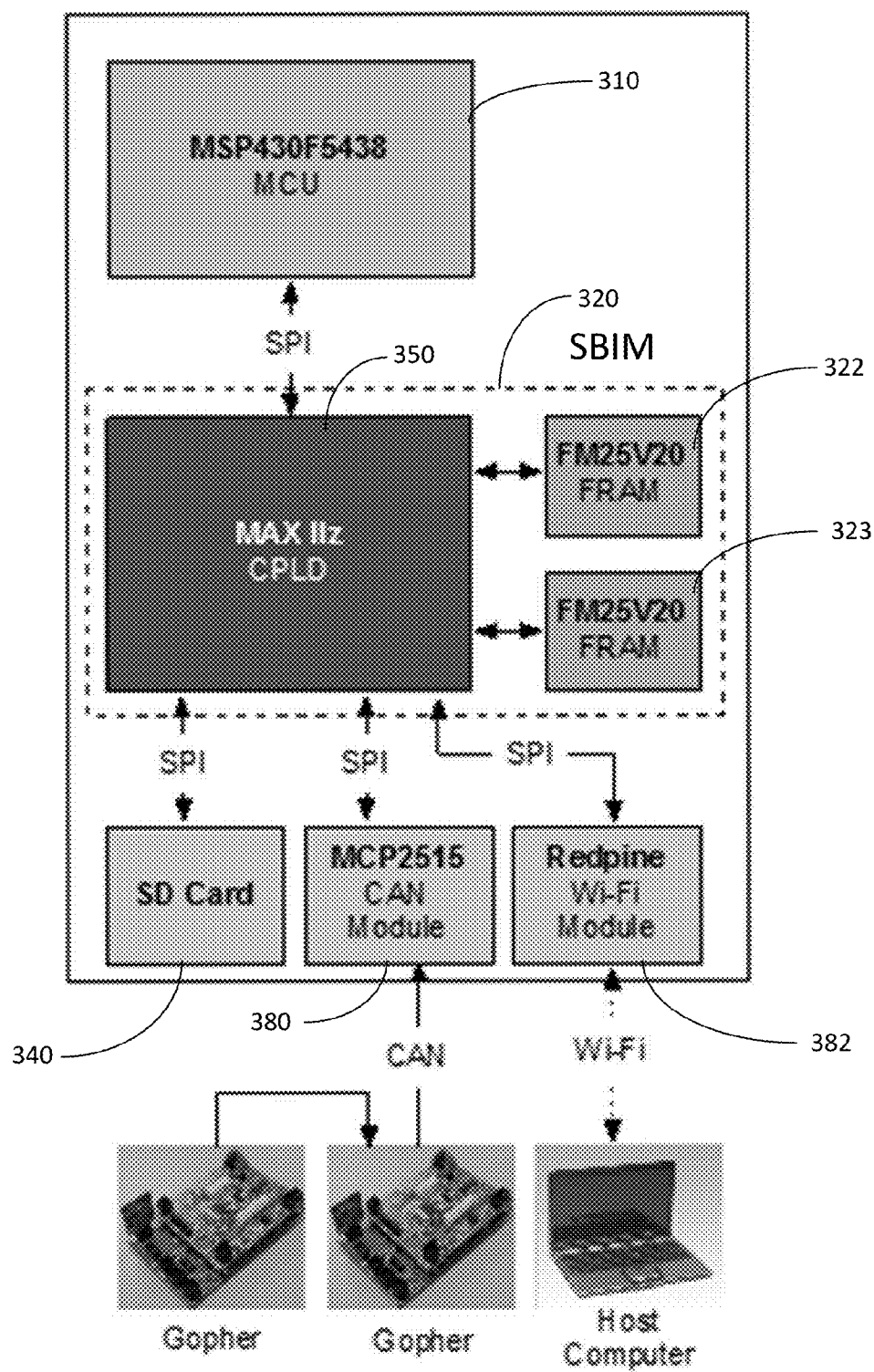
FIG. 15 is a schematic and images illustrating an exemplar sensing system with the SBIM identified as "The SBIM"

As shown in the FIG. 15, the SBIM 320 with a CPLD (bus controller) 350 is added for the MCU 310 to interface the storage devices 322, 323, 340 and other SPI devices 380, 382 through it. The HAL is written to support the storage system through the SBIM. The upper layer software, the file system is able to access to the enhanced storage system with minimum efforts. With the multiple-page write mode and metadata, the enhanced system can provide unparalleled logging performance against other sensor systems and real-time data logging. As a result, the enhanced sensing system provide much a wider range of sampling rates and researchers can take advantage of the wide range of sampling rates for various types of applications.

The SBIM improves the storage systems of typical sensor nodes in terms of writing and reading performance by cutting transaction time on the I/O bus in half and enabling the multi-page write mode and metadata caching without sacrificing precious internal resources of the MCU. In spite of the additional hardware components, energy consumption for data logging is reduced significantly. Also, by using a single I/O bus channel of the MCU, simpler management on accessing peripherals and all the peripherals can take advantage of the DMA data transfer.

Eliminating Double Transaction Problems

The dedicated I/O bus controller enables slave-to-slave transactions, single-source-multiple-sinks transactions and simultaneous transactions. Therefore, the sensing system can use it to realize more efficient transaction with the I/O bus controller than without it.

Enabling Multiple-Sector Write Mode

In most of sensing systems, the SD card driver allocates 512 bytes to buffer data to be written to the SD card just like the other sensor systems and the amount is just good enough to enable the single-sector write mode. The HAL for the SBIM allows multiple-sector write mode using the similar API and the same amount of SRAM buffer. The single-sector data is transferred to the FRAM buffer and clustered as a multiple-page data in the storage system built upon the SBIM when the file system tries to write a page. The HAL keeps track of the buffer utilization and flushes the FRAM buffer when it reaches the pre-determined threshold. In consequence, even though the file system uses the same amount of SRAM buffer and a similar API to write, transferring buffered data with the much more efficient multiple-page write mode is executed background.

Real-Time Metadata Update

Writing sequential pages to the SD card is significantly faster than writing random pages to the SD card. Metadata updates during writing sequential pages causes severe performance drop. In addition the amount of metadata update is just a portion of the sector size; therefore, the entire page where the small portion resides has to be updated whenever a metadata update occurs. To prevent the update of a small portion, some internal SRAM space is allocated for metadata cache. However, this way the precious metadata can be lost by power failure. The SBIM enables the true real-time metadata updates without harming the logging performance. The metadata can be cached in a certain area of the FRAM buffer and read or written in the FRAM buffer. The number of accesses for metadata updates for the file system on the SD card can be significantly diminished by caching metadata in FRAM buffer. The cached metadata in the FRAM buffer are flushed to the SD card when the cache is full or the SD card is unmounted.

Reduced Resource Requirement

Many sensing systems assign multiple SPI ports for interfacing sensors, wireless transmission and storage. The MCU always is involved with relaying the sensed data from sensors to storage or the wireless transmitter. That is, the MCU has to read the sensors and temporarily stores data in SRAM buffer and either transmits or locally stores the buffered data. Utilizing the DMA might be thought of as a solution for efficient and faster simultaneous transactions; however, due to the limited number of DMA channels available for the MCU, true simultaneous data transmission and logging is not possible. With the SBIM, all the transactions between the connected devices can be performed by one or two DMA channels dedicated to the I/O port that are assigned to the SBIM.

Development Stage

In developing the SBIM, the write performance of SD cards used in sensing systems was found to be remarkably lower than the rated write speeds for the SD cards. The single-sector write mode and the random sector writes due to the metadata updates were the major problems. Since the microcontrollers used in sensing systems have very limited amount of internal RAM, it is not desirable to allocate much amount of internal SRAM as buffer space to support the multiple-sector write mode.

Fast external memory technology, such as FRAM or MRAM, had been already used to store the system's metadata. However, accessing the fast non-volatile memory imposed the double transaction problem. There had been efforts to address the double transaction problem; nevertheless, the efforts to eliminate the double transaction problem are limited and not enough to fully support the transactions required. To support all the transactions such as slave-to-slave, single-source-multiple-sinks, and simultaneous transactions, the SBIM combines an I/O bus controller and fast non-volatile external buffers.

SPI is one of the most popular serial interfaces to connect peripherals to the MCU. Since additional components would be required if the I/O controller was employed to any platform, it is imperative that the SBIM utilizes the right components to keep the power consumption as low as possible. RAMTRON's FRAM is used with the SPI interface as external buffer and the I/O bus controller utilizes an Altera's MAXII z CPLD to minimize the power consumption and form-factor size while maximizing the performance. The implementation of the SBIM includes all the necessary circuitry to operate the components mounted and a MicroSD slot is included to connect a MicroSD card. The SBIM is separated into two boards so that the I/O controller itself could be used for some other purposes rather than storage systems as shown in FIG. 16.

Experimental Stage

The SBIM was evaluated using the popular MSP430 from Texas Instruments as the host MCU. MSP430 is popularly used for sensor platforms such as DuraMote, Telos and so on. A test is done to see how the SBIM improves in terms of the throughput, and energy consumption on writing a sequential data stream. Also, data logging performance using a legacy file system (FAT32) is compared between conventional sensor systems using conventional storage system and the new storage system with the SBIM.

Also, the performance of the SBIM combined with the MSP430 was compared with a more powerful ColdFire MCU from Freescale running a Real-Time Operating System (RTOS) and operating at more than 5 times higher clock frequency for the MCU and higher I/O bus clock rate than MSP430-based sensor system. By this experiment, it is very clear to identify the major bottleneck of the SD card based sensor storage is the master-slave I/O bus architecture more than the I/O bus data rate and the CPU processing power.

Setup

Figure 17:
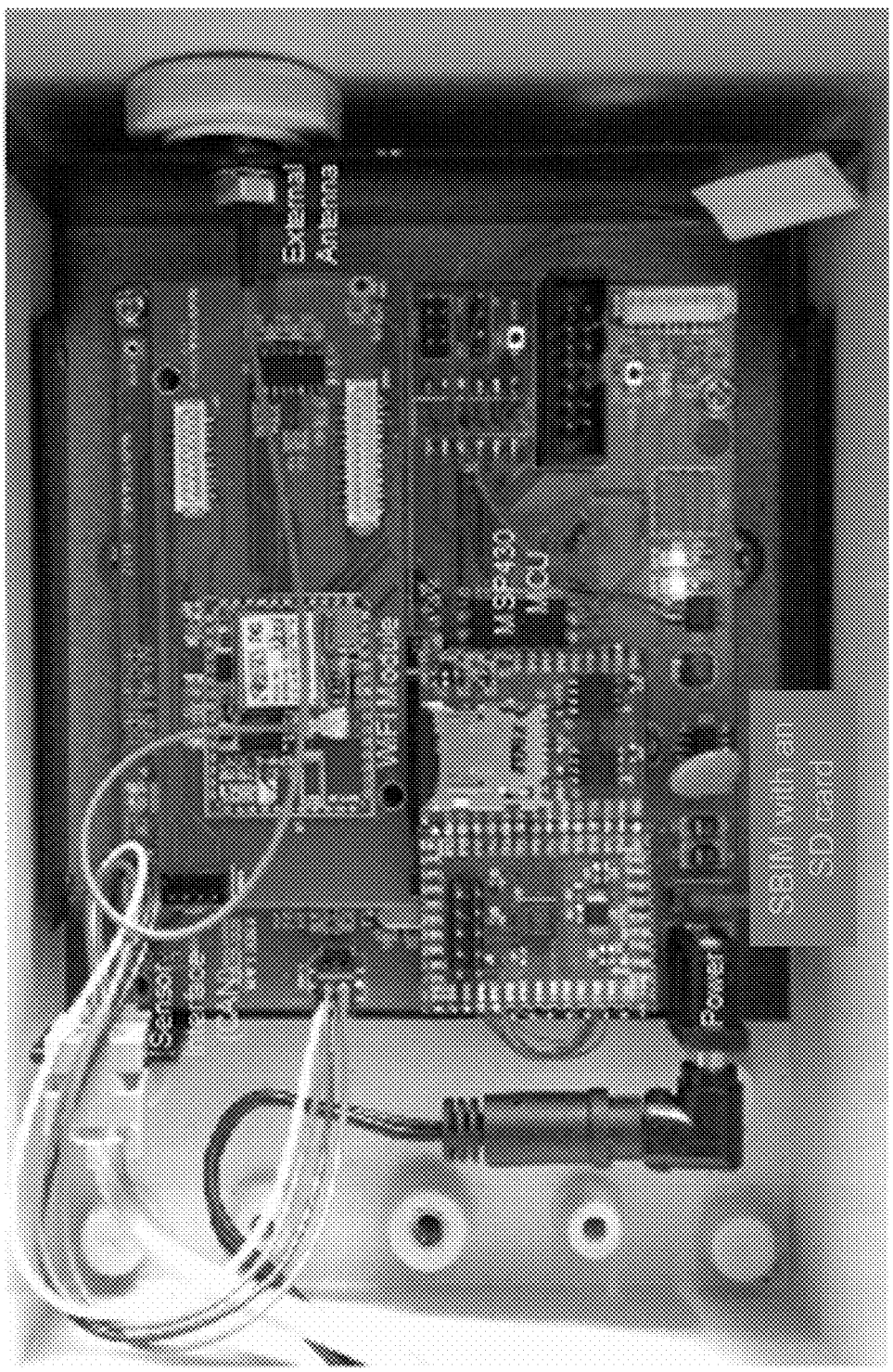
FIG. 17 is a photo of a DuraMote (MSP430 base) with the SBIM.

The TI MSP430, which is included in the DuraMote, is a popular 16-bit MCU that is widely used in sensor systems due to its low power consumption. As shown in FIG. 17, a DuraMote, a multi-purpose wireless sensor node for a wide range of civil engineering applications, was used for the tests. Its MCU is the MSP430F5438, which has 16 KB of RAM, 256 KB of internal flash memory, and has a clock speed of 14.7456 MHz. The direct memory access (DMA) module was used to maximize SPI transfer speed while minimizing the CPU utilization during SPI transfer.

Figure 18:
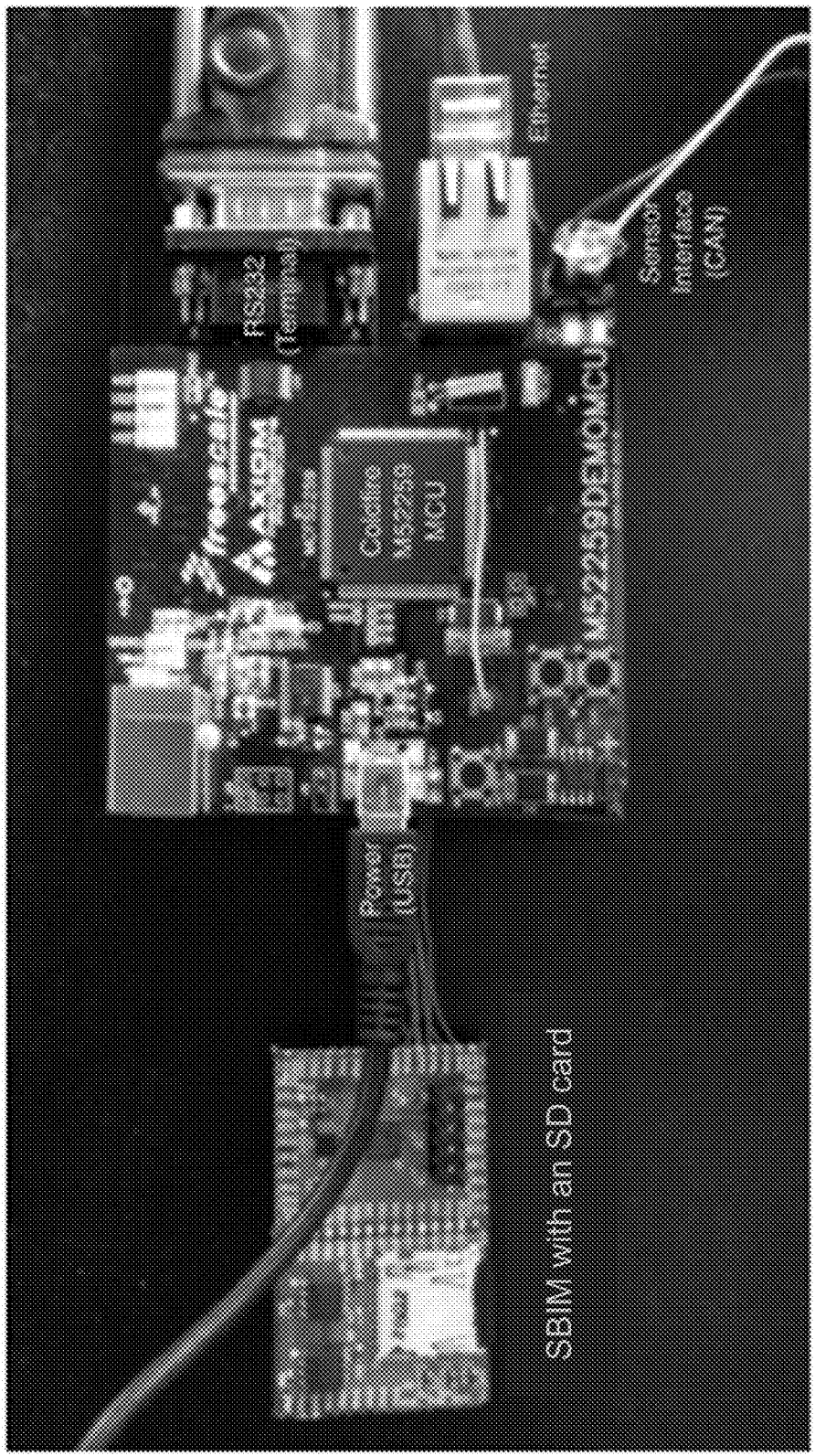
FIG. 18 is a photo of a ColdFire M2259 Development board with the SBIL.

Another system on which the SBIM was tested was a Freescale Semiconductor's M52259DEMOKIT board, nicknamed Kirin3. As shown in FIG. 18, the Kirin3 has a 32-bit ColdFire MCF52259 MCU, whose instruction set architecture (ISA) is derived from the Motorola 68000. It comes with 64 KB RAM, 512 KB internal flash memory, Controller Area Network (CAN), Ethernet, USB-OTG, and built-in ADC. The board is operated at a clock speed of 80 MHz. It is a feature-rich MCU and is considered for an alternative implementation of the same sensor node for civil engineering described above. The specific operating system used, μTasker, has native support for the FAT32 file system and includes drivers for writing to an SD card via SPI.

M.J. Butcher Consulting's μTasker is a lightweight, task-oriented, soft RTOS with built-in support and drivers for SD card storage via SPI and a FAT-compatible file system called utFAT. It is important to note that despite Kirin3 having four DMA channels, it does not actually support DMA with SPI; instead, it relies on a queued-SPI (QSPI) module that supports up to 16 transfers. However, μTasker does not utilize the QSPI feature, but instead transfers data in a standard manner on the SPI bus. For our test, we set the SCK speed to 20 MHz.

Result—Sequential Write Performance

To test the write performance, the MSP430 MCU was used to measure the write throughput with and without the SBIM. With the MSP430 MCU writing directly to the SD card, a buffer of 512 bytes was used. When using the SBIM, tests were conducted using the FRAM to do multi-sector writing and check the effects of data-striping. The block size in the SBIM was varied so that its effects on the throughput could be observed. Lastly, tests were run using the maximum supported SCK speed of 7.3728 MHz (half of the system clock) and with the dynamic switching of the SCK speed.

FIG. 19 shows the write throughput that was achieved, with results separated by the SCK speed used. With the dynamic switching of the SCK speed, it can be seen that the SBIM brings an improvement of 74% with multi-sector writing and 67% when using the data-striping over single-sector writing directly to the SD card. The performance boost is decreased to 60% and 55%, respectively, when an SCK speed of 7.3728 MHz. The data-striping has lower throughput than multi-sector writing since there is a 40 μs delay needed to switch between the two FRAM chips. Dynamic switching was able to perform better than keeping the SCK speed at 7.3728 MHz, since the SCK clock was set to 14.7456 MHz for the test.

The effects of the block size can be seen in FIG. 19, with the faster dynamic switching of the SCK speed showing larger performance gains than without it. With an SCK speed of 7.3828 MHz the throughput begins to plateau with a buffer size of 64 sectors at around 750 kB/s and 650 kB/s for multi-sector and data-striping, respectively. Dynamic switching on the other hand only saw smaller gains in throughput after a buffer size of 64 sectors.

The speed class of the SD card was seen not to affect the write performance of the SBIM.

Energy Consumption

Figure 20:
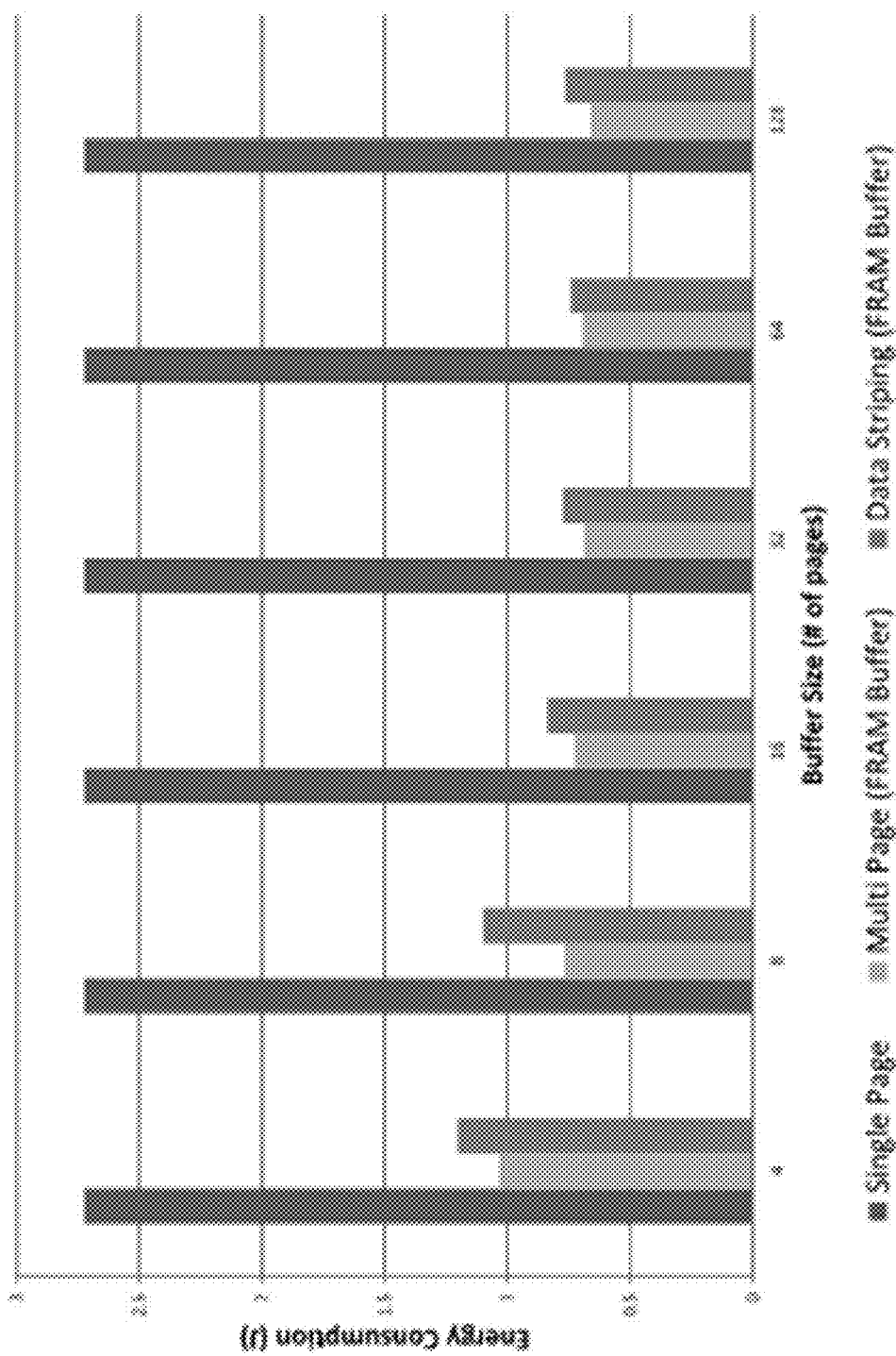
FIG. 20 is a chart showing energy consumption to write 4 MB of data.

For our energy consumption test, the MSP430 was setup with the Transcend 8 GB Class 10 MicroSD card with dynamic switching. FIG. 20 shows how much energy it took to write 4 MB of raw data to the MicroSD card. With dynamic switching, the energy consumption is less than 20 nJ per bit with the SBIM while using the SD card directly needs 80 nJ per bit. Thus, the new storage spends 75% less energy. This result shows that the gain in energy efficiency is so high that the offset overhead incurred by the SBIM hardware is negligible. The data striping introduces overheads to switch the data sources; however, the gain in energy efficiency is superior to the single-page write mode.

FAT32 File System

A FAT32 file system for the MSP430 MCU was implemented, the utFAT was used for the ColdFire MCU and the maximum write throughput was measured. In the test, how the MCUs handled the file system's metadata update was changed. Write throughput was measured for the case of metadata being written back immediately, delayed metadata update like in many sensor systems, and then using the SBIM's data-striping mode. Once again the block size was varied for the SBIM to see the effects it would have when used with a FAT file system.

Figures 21, 22:
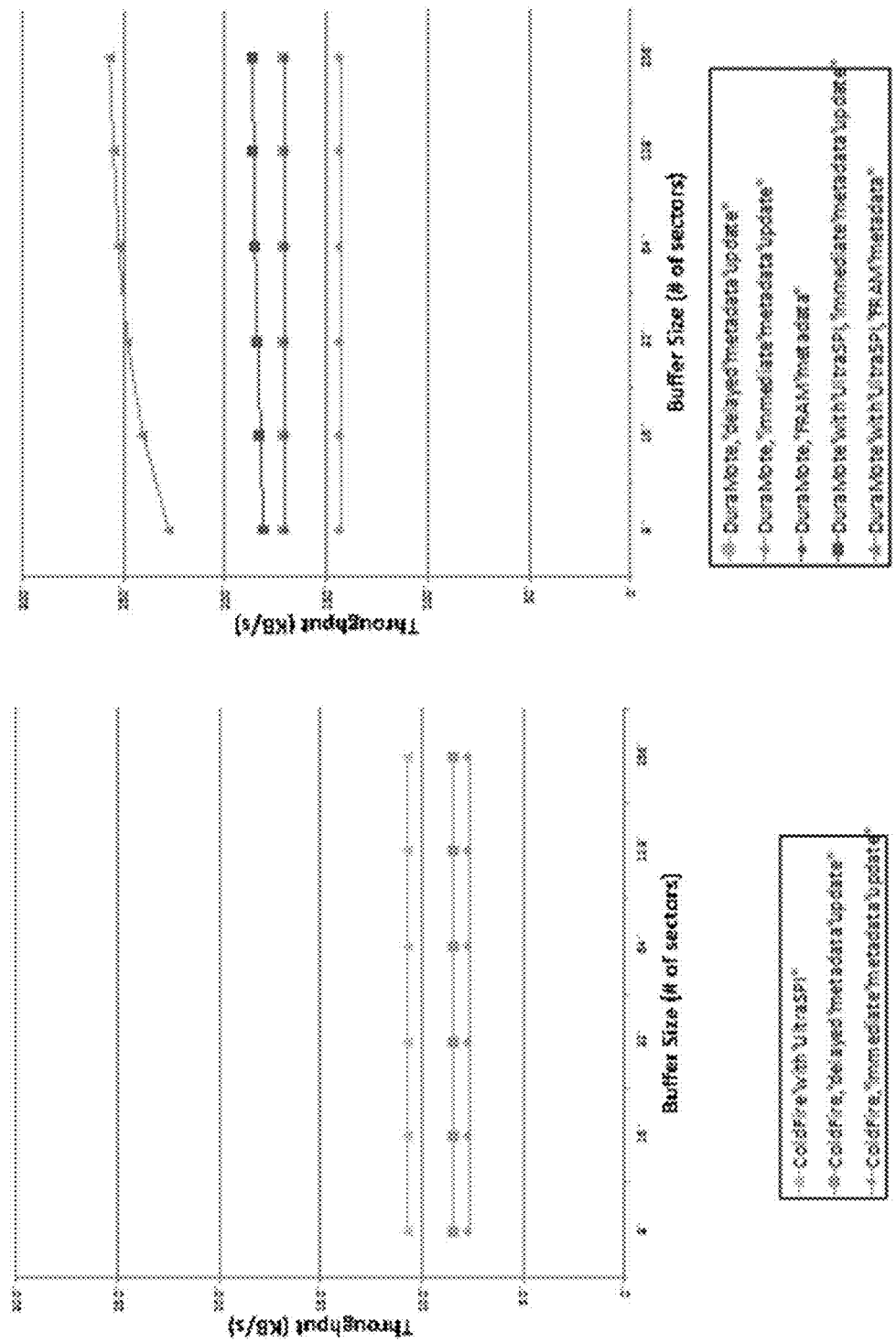
FIG. 21 is a chart showing FAT32 write throughput on the M52259 evaluation board.
FIG. 22 is a chart showing FAT32 write throughput on DuraMote (MSP430 base).

FIG. 21 shows the write throughput for the ColdFire MCU. Without the SBIM, delaying the metadata update would yield 10% improvement in write throughput. The ColdFire MCU with the SBIM is able to bring about a 30% over no delayed metadata update, and a 20% improvement for the case that the metadata is delayed. Unfortunately, varying the block size does not seem to provide much of a performance improvement. This is due to the long internal data processing time and overhead of the application and internal OS routines, and a lack of hardware DMA support for SPI transfers.

The effects of larger buffer size with the MSP430 MCU are shown in FIG. 22. The write throughput saw a 16% improvement when we delayed the metadata update. When the SBIM was used the write throughput went up 37% for a block size of 8 sectors and 44% with a block size of 256 sectors.

The gain in throughput is less than the case of writing sequential data without the FAT32 file system since the file system requires fair amount of time for processing related data and codes. The FSM version FAT32 for the MSP430 MCU shows much higher throughput against the one included in the μTasker due to the efforts to make the file system light and efficient even though the MSP430 MCU is operated at roughly 5 times lower clock speed.

While the invention is susceptible to various modifications, and alternative forms, specific examples thereof have been shown in the drawings and are herein described in detail. It should be understood, however, that the invention is not to be limited to the particular forms or methods disclosed, but to the contrary, the invention is to cover all modifications, equivalents and alternatives falling within the spirit and scope of the appended claims.

In the description above, for purposes of explanation only, specific nomenclature is set forth to provide a thorough understanding of the present disclosure. However, it will be apparent to one skilled in the art that these specific details are not required to practice the teachings of the present disclosure.

The various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter.

It is understood that the embodiments described herein are for the purpose of elucidation and should not be considered limiting the subject matter of the disclosure. Various modifications, uses, substitutions, combinations, improvements, methods of productions without departing from the scope or spirit of the present invention would be evident to a person skilled in the art. For example, the reader is to understand that the specific ordering and combination of process actions described herein is merely illustrative, unless otherwise stated, and the invention can be performed using different or additional process actions, or a different combination or ordering of process actions. As another example, each feature of one embodiment can be mixed and matched with other features shown in other embodiments. Features and processes known to those of ordinary skill may similarly be incorporated as desired. Additionally and obviously, features may be added or subtracted as desired. Accordingly, the invention is not to be restricted except in light of the attached claims and their equivalents.

What is claimed:

1. A serial bus interface module comprising
a plurality of non-volatile memory modules, and
an I/O bus controller coupled to the non-volatile memory modules and having a plurality of ports for connection to a plurality of peripheral devices and to a microprocessor across an I/O bus, wherein the I/O bus controller is configurable to connect a plurality of source slave devices and to a plurality of sink slave devices, each source slave device of the plurality of source slave devices comprising one of a source microprocessor and a plurality of source slave peripheral devices and each sink slave device of the plurality of sink slave devices comprising one of a sink microprocessor and a plurality of sink slave peripheral devices;
wherein the I/O bus controller comprises a multiplexer comprising a plurality of channels and a register coupled to the multiplexer, wherein the multiplexer is couplable to data outputs of all of the connected plurality of source slave peripheral devices, wherein the multiplexer is couplable to data inputs of all of the connected plurality of sink slave peripheral devices, and wherein the register is configured to receive a control signal from a host microprocessor, and
wherein the multiplexer enables multiple simultaneous independent direct paths between the connected plurality of source slave peripheral devices and the connected plurality of sink slave peripheral devices.

2. The serial bus interface module of claim 1 wherein the I/O bus controller is configurable to allow multiple slave-to-slave transactions simultaneously.

3. The serial bus interface module of claim 2, wherein a slave-to-slave transaction comprises flushing data from one of the plurality of non-volatile memory modules to one of the source slave peripheral devices or one of the sink slave peripheral devices comprising a secure digital memory device.

4. The serial bus interface module of claim 1 wherein the I/O bus controller is configurable to allow read caching transactions between one source slave device and multiple sink slave devices.

5. The serial bus interface module of claim 1 wherein the I/O bus controller is configurable to allow flushing transactions simultaneously with buffering on the non-volatile memory modules.

6. The serial bus interface module of claim 1 further comprising a clock control coupled to the register and configured to receive a clock source from a host microprocessor.

7. A serial bus interface module comprising
a plurality of non-volatile memory modules, and
a SPI bus controller having a first plurality of channels assigned to the plurality of non-volatile memory modules and a second plurality of channels assignable to an SD card, a plurality of slave devices, and a master device, wherein each channel has a multiplexer configured to connect input and output ports of each of the plurality of non-volatile memory modules and each of a plurality of slave devices, an SD card and a master device connected to the serial bus interface module to each other for direct simultaneous connectivity between all of the plurality of non-volatile memory modules and each of the plurality of slave devices, the SD card and the master device connected to the serial bus interface module.

8. The serial bus interface module of claim 7 wherein each channel of the first and second plurality of channels has a register that holds a SCK pause state, a chip select assertion state and a source slave device address.

9. A system comprising
a serial bus interface module comprising
a plurality of non-volatile memory modules, and
an I/O bus controller coupled to the non-volatile memory modules and having a plurality of ports for connection to a plurality of peripheral devices and to a microprocessor across an I/O bus, wherein the I/O bus controller is configurable to connect to a plurality of source slave devices and to a plurality of sink slave devices, each source slave device of the plurality of source slave devices comprising one of a source microprocessor and a plurality of source slave peripheral devices and each sink slave device of the plurality of sink slave devices comprising one of a sink microprocessor and a plurality of sink slave peripheral devices,
a plurality of devices coupled to the serial bus interface module, and
a microprocessor coupled to the serial bus interface module,
wherein the I/O bus controller comprises a multiplexer, wherein the multiplexer is couplable to data inputs of all of the connected plurality of sink slave peripheral devices and microprocessor, and wherein the I/O bus controller comprises a register coupled to the multiplexer, and the multiplexer comprising a plurality of channels, wherein the multiplexer is couplable to data outputs of all of the connected plurality of source peripheral devices and microprocessor, wherein the register is configured to receive a control signal from a host microprocessor, and wherein the multiplexer enables multiple simultaneous independent direct paths between the connected plurality of source slave peripheral devices and the connected plurality of sink slave peripheral devices.

10. The system of claim 9 wherein the plurality of devices comprise one or more sensor devices.

11. The system of claim 10 wherein the plurality of devices comprises a memory card.

12. The system of claim 11 wherein the memory card comprises a SD card.

13. The system of claim 9 wherein I/O bus controller is configurable to allow one of slave-to-slave transactions, read caching transactions between one source slave device and multiple sink slave devices, and flushing transactions simultaneously with buffering on the non-volatile memory modules.

14. A system comprising
a serial bus interface module comprising
a plurality of non-volatile memory modules,
a plurality of slave devices coupled to the serial bus interface module,
a SPI bus controller having
a first plurality of channels assigned to the plurality of non-volatile memory modules and a second plurality of channels assignable to an SD card,
a plurality of slave devices, and a master device,
wherein each channel has a multiplexer configured to connect input and output ports of each of the plurality of non-volatile memory modules and each of the plurality of slave devices, an SD card and a master device connected to the serial bus interface module to each other for direct simultaneous connectivity between all of the plurality of non-volatile memory modules and each of the plurality of slave devices, the SD card and the master device connected to the serial bus interface module, and
a microprocessor coupled to the serial bus interface module.

15. The system of claim 14 wherein the plurality of slave devices comprise one or more sensor devices.

16. The system of claim 15 wherein the plurality of slave devices comprises a memory card.

17. The system of claim 16 wherein the memory card comprises a SD card.

18. The system of claim 14 wherein each channel of the first and second plurality of channels has a register that holds a SCK pause state, a chip select assertion state and a source device address.

19. The serial bus interface module of claim 5, wherein a first non-volatile memory module performs flushing transactions while a second non-volatile memory module simultaneously performs buffering.

20. The system of claim 13, wherein a first non-volatile memory module performs flushing transactions while a second non-volatile memory module simultaneously performs buffering.

* * * * *